(12) United States Patent
Daoud et al.

(10) Patent No.: US 12,160,766 B2
(45) Date of Patent: Dec. 3, 2024

(54) MULTI-NETWORK WIRELESS COVERAGE MANAGEMENT

(71) Applicant: Charter Communications Operating, LLC, St. Louis, MO (US)

(72) Inventors: Mohamed Daoud, Englewood, CO (US); Hossam H. Hmimy, Aurora, CO (US); Hany A. Heikal, Aurora, CO (US); Muhammad J. Khan, Greenwood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 288 days.

(21) Appl. No.: 17/700,303

(22) Filed: Mar. 21, 2022

(65) Prior Publication Data

US 2023/0300661 A1 Sep. 21, 2023

(51) Int. Cl.
*H04W 28/02* (2009.01)
*H04L 43/10* (2022.01)
*H04W 48/16* (2009.01)
*H04W 52/28* (2009.01)

(52) U.S. Cl.
CPC ......... *H04W 28/0215* (2013.01); *H04L 43/10* (2013.01); *H04W 28/0226* (2013.01); *H04W 48/16* (2013.01); *H04W 52/283* (2013.01)

(58) Field of Classification Search
None
See application file for complete search history.

(56) References Cited

U.S. PATENT DOCUMENTS

| | | | |
|---|---|---|---|
| 5,956,327 A * | 9/1999 | Faerber | H04W 88/08 455/450 |
| 2009/0069008 A1* | 3/2009 | Highsmith | H04L 43/0817 455/424 |
| 2021/0194569 A1* | 6/2021 | Ray Chaudhuri | H04B 7/15507 |
| 2021/0219201 A1* | 7/2021 | Shimizu | H04W 88/10 |

* cited by examiner

*Primary Examiner* — Anh Ngoc M Nguyen
(74) *Attorney, Agent, or Firm* — Armis IP Law, LLC

(57) ABSTRACT

A wireless network environment includes a communication management resource operative to manage wireless connectivity provided by multiple different wireless networks, each of which supports a different wireless communication protocol to provide wireless access to communication devices in a network environment. The communication management resource monitors a performance of the multiple wireless networks. In response to detecting an inability of a first wireless network of the multiple wireless networks to provide wireless coverage in a geographical region, the configuration management resource adjusts operation of a second wireless network to provide expanded wireless coverage in the geographical region.

29 Claims, 18 Drawing Sheets

TIME T2

MULTI-NETWORK WIRELESS COVERAGE MANAGEMENT

BACKGROUND

Conventional private wireless networks are designed and architected for specific purposes and related groups of users. For example, factories, enterprises, warehouses, schools, etc., are prime examples of entities that leverage private wireless networks. To provide users wireless connectivity to a remote network, most private wireless networks may support multiple different types of wireless technology (and corresponding wireless communication protocols) such as LTE, 5G, Wi-Fi™, etc.

BRIEF DESCRIPTION OF EMBODIMENTS

Embodiments herein provide improved implementation of wireless access networks and expand use of limited wireless bandwidth in a network environment.

More specifically, a wireless network environment includes a communication management resource. The communication management resource manages wireless connectivity provided by multiple different wireless networks to communication devices. Each of the wireless networks supports a different wireless communication protocol to provide wireless access to communication devices in a network environment. The communication management resource monitors a performance of the multiple wireless networks. In response to detecting an inability (such as due to a wireless network outage) of a first wireless network of the multiple wireless networks to provide wireless coverage in a particular geographical region of the wireless network environment, the communication management resource adjusts operation of a second wireless network to provide expanded wireless coverage in the geographical region.

In further example embodiments, the first wireless network provides first wireless connectivity to first communication devices via a first wireless communication protocol; the second wireless network provides second wireless connectivity to second communication devices via a second wireless communication protocol. Each of the communication devices support wireless connectivity in accordance with the first wireless communication protocol and the second wireless communication protocol. Communication devices initially in communication with the first wireless network communicate with the first wireless network via a first wireless communication protocol. In response to detecting the inability of the first wireless network to provide wireless connectivity via a first wireless communication protocol in a geographical region, the communication management resource expands coverage of the second wireless network to provide wireless coverage to the communication devices in the geographical region via the second wireless communication protocol.

The communication management resource can be configured to adjust the operation of the second wireless network in any suitable manner. For example, in one embodiment, the communication management resource adjusts beamforming settings of a wireless base station in the second wireless network to provide expanded coverage during the outage of the first wireless network. Additionally, or alternatively, the communication management resource can be configured to adjust operation of the second wireless network via increasing wireless power transmission levels of communications transmitted by the second wireless network (and corresponding one or more wireless base stations).

In still further example embodiments, the communication management resource can be configured to adjust operation of the second wireless network via selection of an additional wireless carrier frequency of transmitting communications from the second wireless network.

In still further example embodiments, the communication management resource adjusts operation of the second wireless network includes via: i) detecting presence of a wireless access point in the second wireless network, the wireless access point operative to support backup wireless connectivity in the geographical region, the wireless access point set to a standby mode in which the wireless access point does not support backup wireless connectivity with any of the communication devices in the network environment prior to detecting the inability of the first wireless network; and ii) switching operation of the wireless access point from the standby mode to an active mode in response to detecting the inability of the first wireless network to provide wireless coverage in the geographical region, the active mode of the wireless access point providing the backup wireless connectivity to the communication devices in the geographical region. As previously discussed, the first wireless network supports a first wireless communication protocol; the wireless access point in the second wireless network supports a second wireless communication protocol.

Still further example embodiments herein include, via the communication management resource, expanding an area of wireless coverage of the second wireless network to accommodate the inability (outage) of the first wireless network to provide wireless coverage to any communication devices in the geographical region. Prior to the outage, the first wireless network supports a first wireless communication protocol; during the outage, the second wireless network supports a second wireless communication protocol in the expanded area of coverage previously serviced by the first wireless network.

In yet further embodiments, the communication management resource or other suitable entity tracks locations of first mobile communication devices in the geographical region supported by the first wireless network; the communication management resource adjusts operation of the second wireless network to provide the expanded wireless coverage in the geographical region via adjusting the operation of the second wireless network based on the locations of the first mobile communication devices. In further example embodiments, the communication devices losing access via the failed first wireless network (as a result of the wireless access outage) automatically switch over (such as handoff) to the second wireless network using the second wireless communication protocol.

Thus, in one embodiment, prior to the detected outage, the communication management resource controls the first wireless network and the second wireless network such that only the first wireless network provides wireless coverage in the geographical region. Subsequent to detecting the outage associated with the first wireless network in the geographical region, the communication management resource adjusts operation of the second wireless network to provide the expanded wireless coverage in the geographical region using the second wireless communication protocol.

Embodiments herein are useful over conventional techniques. For example, as previously discussed, a communication management resource adjusts operation of one or more wireless networks in response to detecting a wireless network outage. Such operations provide more reliable wireless coverage to corresponding communication devices.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: monitor performance of multiple networks, each of which supports a different wireless communication protocol to provide wireless access to communication devices in a network environment; detect an inability of a first wireless network of the multiple wireless networks to provide wireless coverage in a geographical region; and in response to detecting the inability, adjust operation of a second wireless network to provide expanded wireless coverage in the geographical region.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
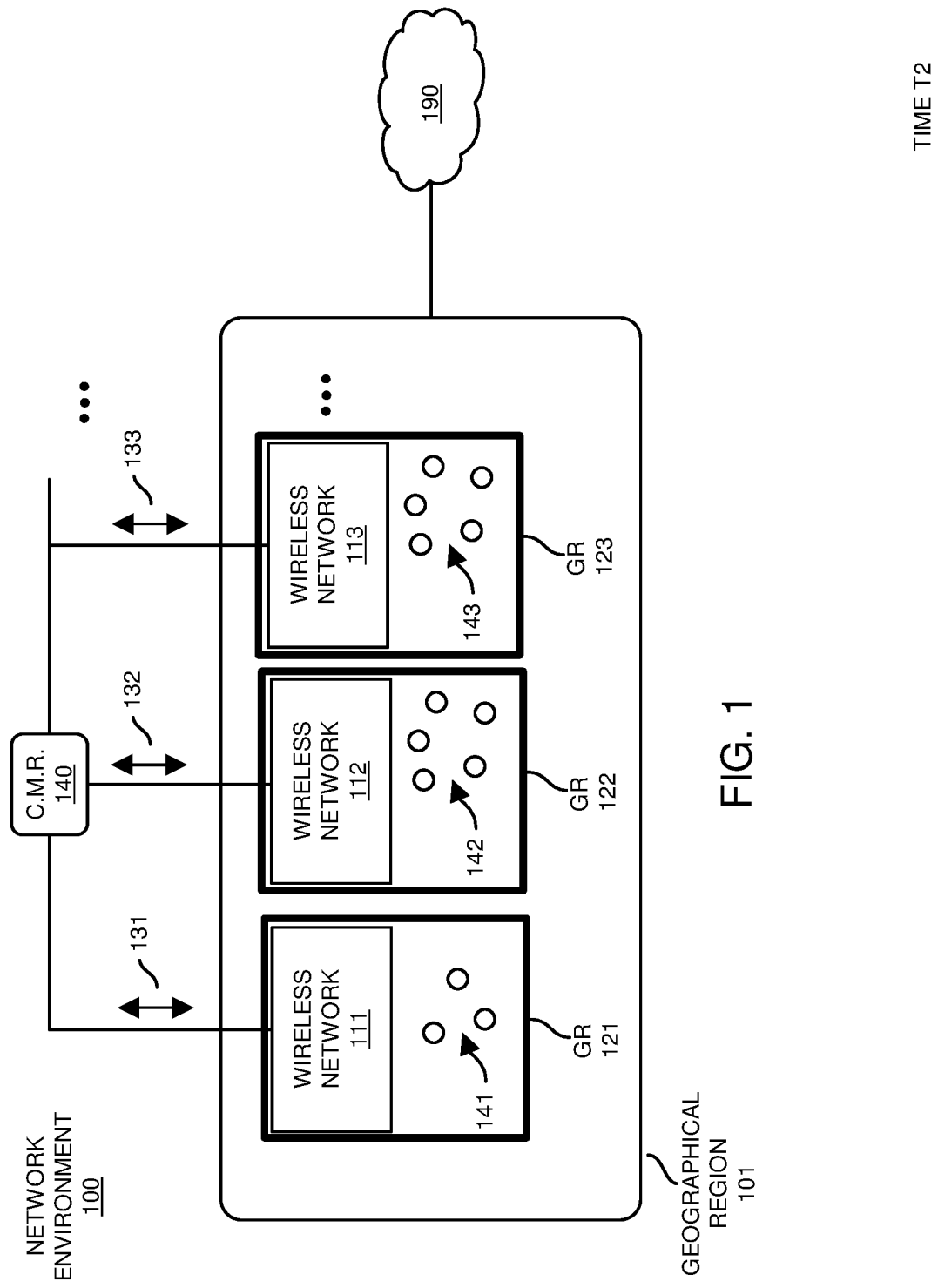
FIG. 1 is an example diagram illustrating monitoring and control of multiple wireless networks according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

According to conventional enterprise technology, each private wireless technology works independently of the other. For example, a Private LTE (PLTE) network and WIFI network provide wireless access without any coordination with respect to each other. In some cases, the PLTE wireless network could be covering a first geographical part of the enterprise while the WIFI covers another geographical part of the enterprise. If any of these technologies fail, a portion of the enterprise (geographical region associated with the enterprise) could be left without wireless coverage, while the other technology is unaware of that.

Embodiments herein propose a new communication management resource that communicates with different technologies (each supporting different wireless communication protocol) in the private wireless network to identify coverage gaps and accounts for them using power control or features like beamforming, power level control, etc., for example. Technologies communicate with each other and coordinate through a PW Server (a.k.a., communication management resource) for optimal coverage. The PW server is connected to the backend of each technology in the private wireless network for example connected to the EPC in the case of LTE and the 5G Core in case of 5G and the WIFI controller in the case of WIFI.

The PW server monitors all the private wireless technologies and knows their coverage area and connected devices. The PW server exchanges a heartbeat with each technology backend (EPC, 5G core, WIFI controller) to ensure the network is up and operational without failures.

The PW server analyzes areas of overlap using either propagation maps or prior knowledge of coverage. If there is a capacity constraint on one technology, then the server rebalances multi-technology devices. For example, WiFi+LTE devices may be instructed to communicate only on LTE to reduce congestion on WiFi or vice versa. Since the PW server knows the #of APs and #of devices on each technology, it can do this rebalancing when needed.

Examples of the parameters sent from each technology to the PW server are:

EIRP (wireless transmit power level)
Number of AP's
Frequency (wireless channel carrier frequency)
Status of each AP
Number of connected and idle devices
Downlink and Uplink traffic All these parameters are saved in a database in the PW server.

The PW server shall be able to infer the coverage area from the number of AP's, their locations, and EIRP of each ACCESS POINT, such as based on their configuration settings, and/or communication devices supported.

If the heartbeat from any network stops then the PW server assumes this network is down and instructs the other network to account for the coverage gap of the down network. This accounting happens by increasing the EIRP of the other network to expand their coverage area, or turn on more AP's (if available), or use beamforming to direct the signal to the devices in the poor coverage area.

For example, both WIFI and PLTE are used in a Private Wireless enterprise and the PW server is communication with both WIFI AP controller and the LTE EPC. Both the WIFI controller and EPC are sending the below data periodically to the PW server.

EIRP
Number of AP's
Frequency
Status of each AP
Number of connected and idle devices
Downlink and Uplink traffic From the number of AP's (wireless access stations), frequency, and EIRP the PW server could draw an RF propagation model and infer the coverage area of each technology. After a while, if the heartbeat from the WIFI controller stops, the PW servers assumes the WIFI network is down. The PW server instructs the LTE network to increase the EIRP of one or more wireless access points (if allowed by the FCC) to cover the area previously covered by WIFI. The PW server instructs the LTE AP's to beamform the signal (if the LTE AP's are beamforming capable) to covers subscribers in the previously covered area by WIFI or if applicable turn one new LTE AP's. This will ensure the devices in the previously covered WIFI coverage area have LTE signal. Once the heartbeat between the PW server and WIFI controller is restored and the LTE controller starts reporting data again the PW server cancels all the changes it previously instructed the LTE network to do.

Now, with reference to the drawings, FIG. 1 is an example diagram illustrating monitoring and control of multiple wireless networks according to embodiments herein.

In this example embodiment, the network environment 100 includes implementation of multiple different wireless networks in the geographical region 101. For example, geographical region 101 is subdivided into sub-geographical region 121, sub-geographical region 122, sub-geographical region 123, etc. Each of the wireless networks in geographical region 101 includes one or more instances of wireless equipment (such as wireless access stations) providing one or more mobile communication devices in geographical region 101 wireless access to a remote network 190.

The different wireless networks can be configured to provide respective communication devices wireless connectivity via a different wireless communication protocol.

For example, wireless network 111 and corresponding wireless access stations (such as one or more of wireless base stations, wireless access points, etc.) implement a wireless communication protocol #1 to provide respective communication devices 141 (mobile or stationary) in sub-geographical region 121 wireless access to the remote network 190; wireless network 112 and corresponding wireless access stations (such as one or more of wireless base stations, wireless access points, etc.) execute a wireless communication protocol #2 to provide respective communication devices 142 (mobile or stationary) in sub-geographical region 122 wireless access to the remote network 190; wireless network 113 and corresponding wireless access stations (such as one or more of wireless base stations, wireless access points, etc.) execute a wireless communication protocol #3 to provide respective communication devices 143 (mobile or stationary) in sub-geographical region 123 wireless access to the remote network 190; and so on.

Each of the wireless communication protocols can be of any suitable type such as: Wi-Fi™, millimeter wave, LTE (Long Term Evolution), 5G, etc. The wireless access stations can be any suitable type of hardware such as Wi-Fi™ access point, gnodeB (millimeter wave or low frequency), enodeB, LTE base station, etc., depending on a respective wireless communication protocol implemented.

In one embodiment, millimeter wave refers to extremely high frequency (EHF), which includes a band of radio frequencies that is well suited for 5G networks. Compared to the frequencies below 5 GHz previously used by mobile devices, millimeter wave technology allows transmission on frequencies between 30 GHz and 300 GHz.

Each of the groupings of communication devices 141, 142, 143, etc., can be configured to operate in multiple different modes. For example, each of the communication devices can be configured to support multiple different wireless communication protocols such as wireless communication protocol #1, wireless communication protocol #2, wireless communication protocol #3, etc.

As further shown, the communication management resource 140 manages wireless connectivity provided by and/or configurations of the multiple different wireless networks 111, 112, 113, etc., in order to support connectivity with communication devices 141, 142, 143, etc.

In one embodiment, as previously discussed, each of the wireless networks 111, 112, 113, etc., supports a different wireless communication protocol to provide substantially non-overlapping wireless access to communication devices in a network environment. For example, in one embodiment, the wireless network 111 supports wireless communication protocol #1; the wireless network 112 supports wireless communication protocol #2; the wireless network 113 supports wireless communication protocol #3; etc.

Via respective communications with the wireless networks, the communication management resource 140 monitors performance of each of the multiple wireless networks.

More specifically, via communications 131 the communication management resource 140 communicates commands to and/or receives feedback from the respective wireless network 111 (and corresponding components such as one or more corresponding wireless base stations, wireless access points, etc.). The commands control operation (such as beamforming, wireless power transmit levels, etc.) of the one or more wireless access stations in the wireless network 111. The received feedback indicates the health status (i.e., performance) of the wireless network 111 and the corresponding ability of the one or more wireless access stations (a.k.a., wireless base station, wireless access points, etc.) in the wireless network 111 to provide respective communication devices wireless connectivity to the remote network 190 via wireless communication protocol #1.

Via communications 132 the communication management resource 140 communicates commands to and/or receives feedback from the respective wireless network 112 (and corresponding components such as one or more corresponding wireless base stations, wireless access points, etc.). The commands control operation (such as beamforming, wireless power transmit levels, etc.) of the one or more wireless access stations in the wireless network 112. The received feedback indicates the health status (i.e., performance) of the wireless network 112 and the corresponding ability of the one or more wireless access stations (a.k.a., wireless base station, wireless access points, etc.) in the wireless network 112 to provide respective communication devices wireless connectivity to the remote network 190 via wireless communication protocol #2.

Via communications 133 the communication management resource 140 communicates commands to and/or receives feedback from the respective wireless network 113 (and corresponding components such as one or more corresponding wireless base stations, wireless access points, etc.). The commands control operation (such as beamforming, wireless power transmit levels, etc.) of the one or more wireless access stations in the wireless network 113. The received feedback indicates the health status (i.e., performance) of the wireless network 113 and the corresponding ability of the one or more wireless access stations (a.k.a., wireless base station, wireless access points, etc.) in the wireless network 113 to provide respective communication devices wireless connectivity to the remote network 190 via wireless communication protocol #3.

As further discussed herein, in response to detecting an inability (such as an wireless network outage) of a first wireless network of the multiple wireless networks to provide wireless coverage in a particular geographical region of the wireless network environment, the communication management resource 140 adjusts operation of one or more other non-failing wireless network to provide expanded wireless coverage in the geographical region to accommodate the outage and provide continued wireless access to respective communication devices.

Figure 2:
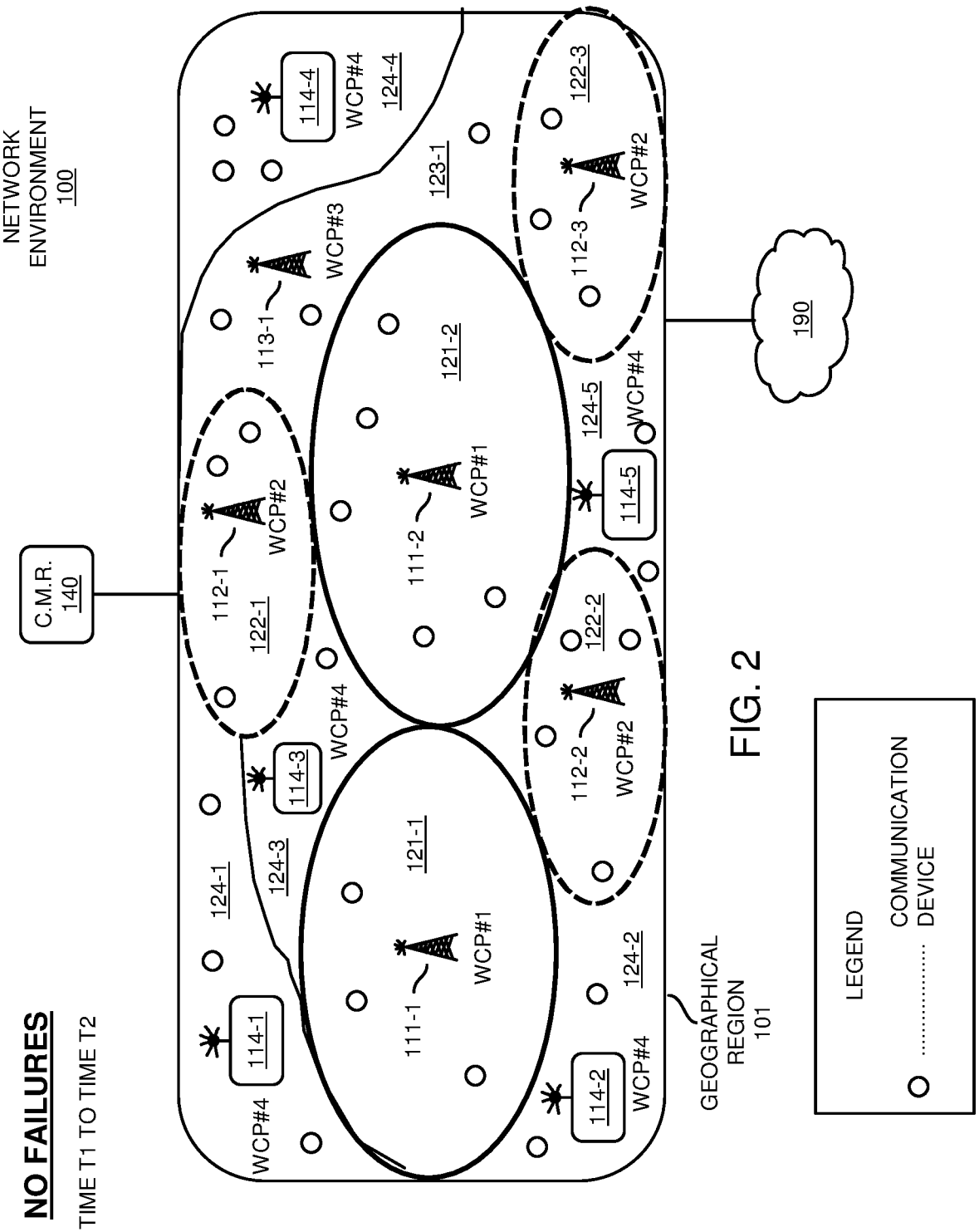
FIG. 2 is an example diagram illustrating implementation of multiple wireless networks during a condition in which there are no failures in a respective network environment according to embodiments herein.

FIG. 2 is an example diagram illustrating implementation of multiple wireless networks during a condition in which there are no failures in a respective network environment according to embodiments herein.

In this example embodiment, between time T1 and time T2 when there are no failures, assume that each sub-geographical region of geographical region 101 is serviced by only a respective single type of wireless communication protocol.

For example, wireless network 111 includes: i) wireless base station 111-1 implementing wireless communication protocol #1 (such as LTE) to provide mobile communication devices in sub-geographical region 121-1 wireless access through wireless base station 111-1 to remote network 190, ii) wireless base station 111-2 implementing wireless communication protocol #1 to provide mobile communication devices in sub-geographical region 121-2 wireless access through wireless base station 111-2 to remote network 190.

Wireless network 112 includes: i) wireless base station 112-1 implementing wireless communication protocol #2 (such as 5G) to provide mobile communication devices in sub-geographical region 122-1 wireless access through wireless base station 112-1 to remote network 190, ii) wireless base station 112-2 implementing wireless communication protocol #2 to provide mobile communication devices in sub-geographical region 122-2 wireless access through wireless base station 112-2 to remote network 190, and iii) wireless base station 112-3 implementing wireless communication protocol #2 to provide mobile communication devices in sub-geographical region 122-3 wireless access through wireless base station 112-3 to remote network 190.

Wireless network 113 includes wireless base station 113-1 implementing wireless communication protocol #3 (such as millimeter wave) to provide mobile communication devices in sub-geographical region 123-1 wireless access through wireless base station 113-1 to remote network 190.

Wireless network 114 includes: i) wireless base station 114-1 implementing wireless communication protocol #4 (such as Wi-Fi™) to provide mobile communication devices in sub-geographical region 124-1 wireless access through wireless base station 114-1 to remote network 190, ii) wireless base station 114-2 implementing wireless communication protocol #4 to provide mobile communication devices in sub-geographical region 124-2 wireless access through wireless base station 114-2 to remote network 190, iii) wireless base station 114-3 implementing wireless communication protocol #4 to provide mobile communication devices in sub-geographical region 124-3 wireless access through wireless base station 114-3 to remote network 190, iv) wireless base station 114-4 implementing wireless communication protocol #4 to provide mobile communication devices in sub-geographical region 124-4 wireless access through wireless base station 114-4 to remote network 190, and v) wireless base station 114-5 implementing wireless communication protocol #4 to provide mobile communication devices in sub-geographical region 124-5 wireless access through wireless base station 114-5 to remote network 190.

Figure 3:
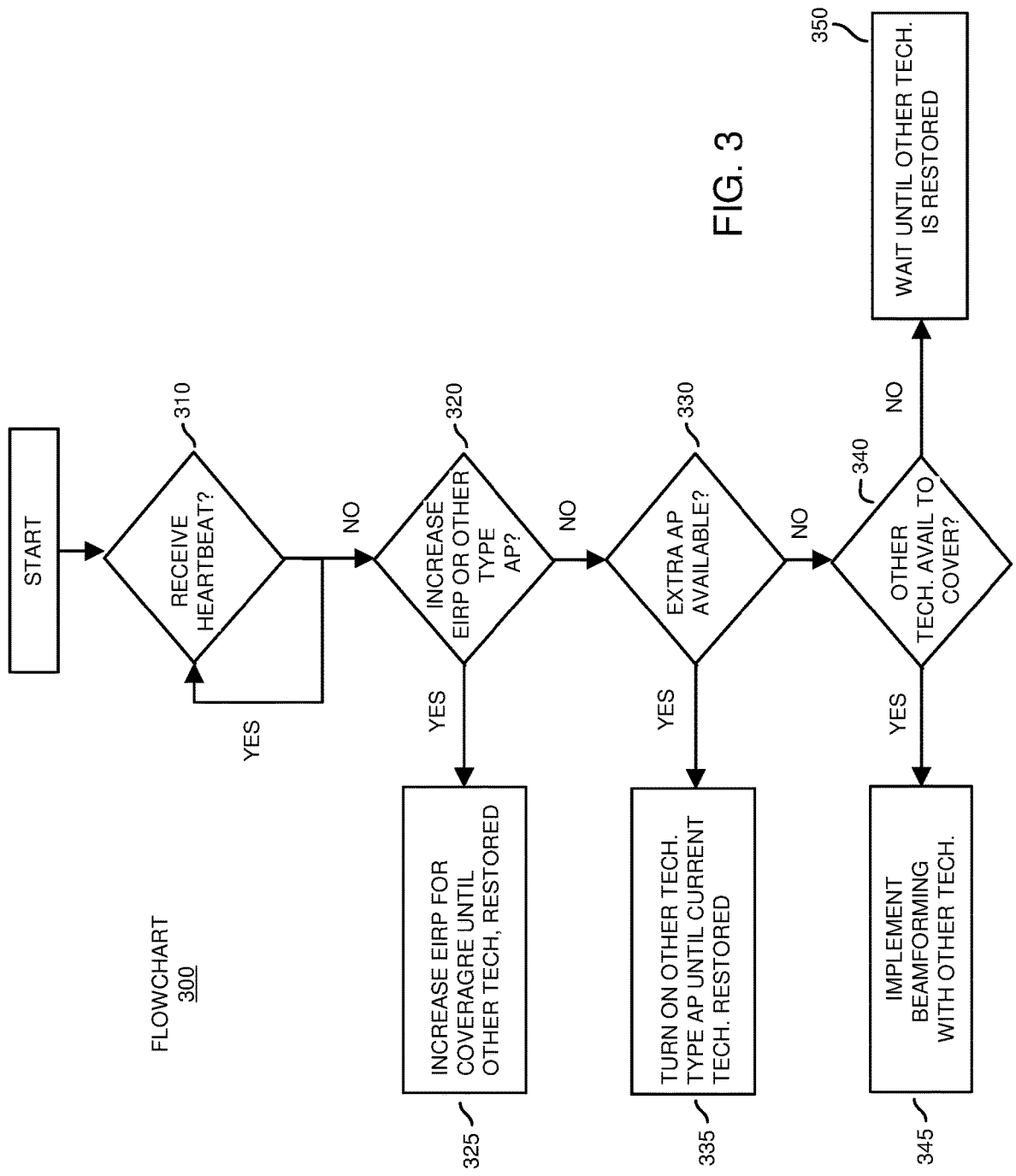
FIG. 3 is an example diagram illustrating a flowchart of monitoring and providing control of multiple different wireless networks according to embodiments herein.

FIG. 3 is an example diagram illustrating a flowchart of monitoring and providing control of multiple different wireless networks according to embodiments herein.

In this example embodiment, with reference to the flowchart 300, the communication management resource 140 monitors for heartbeat communications from each of the different wireless networks to determine if the respective network has any failed components such as (wireless stations) that no longer provide wireless service to respective communication devices. If no failure is detected based on continuously received heartbeat communications (or performance information) from each wireless network and corresponding wireless stations, the wireless management resource continues (loops) flow back to processing operation 310 of monitoring each of the wireless networks in the performance of providing wireless access to communication devices.

Alternatively, if the communication management resource 140 detects a failure based on received heartbeat communications (or performance information) from a wireless network and/or corresponding wireless station in operation 310, the wireless management resource continues flow at processing operation 320.

In processing operation 320, the communication management resource 140 determines whether it is possible to increase a wireless transmit power level (such as EIRP) or adjust another parameter to provide another type of wireless coverage (such as based on a different wireless communication protocol) to the region of wireless coverage longer serviced by the detected failing wireless network.

Note that equivalent isotropic radiated power, EIRP, is the total radiated power from a transmitter antenna times the numerical directivity of the antenna in the direction of the receiver, or the power delivered to the antenna times the antenna numerical gain. If an adjustment is deemed possible appropriate in processing operation 320, flow continues at operation 325 in which the communication management resource 140 increases the wireless transmit power level of communications associated with one or more non-failing wireless stations (such as one or more wireless access points or one or more wireless base stations) nearby the failing one or more wireless stations to provide wireless services to communication devices in the respective region of wireless coverage or geographical region no longer serviced by the failing wireless network.

Alternatively, in processing operation 320, if the communication management resource 140 determines that is not possible to increase the wireless power transmit level or provide another type of access service to the geographical region experiencing the wireless coverage failure, processing continues at operation 330.

In processing operation 330, the communication management resource 140 determines if there are extra one or more wireless access points (of a different wireless communication protocol than the failing wireless communication protocol) to provide extended wireless coverage to the one or more communication devices losing wireless access services. If so, in processing operation 335, the communication management resource 140 activates such wireless stations (out of a standby mode) to provide the communication devices wireless access to the remote network 190.

In processing operation 335, the communication management resource 140 continuously monitors the original failing wireless network to determine if it is able to provide wireless services again. In response to detecting that the previously failing wireless network is now fully functional, the communication management resource 140 discontinues use of the backup wireless services provided by the one or more extra wireless access points.

If the communication management resource 140 determines that there are no extra access points available to provide backup wireless services to the currently failing wireless network in processing operation 330, the communication management resource 140 executes processing operation 340.

In processing operation 340, the communication management resource 140 determines if there are other technologies available to provide the communication devices wireless connectivity. If so, the communication management resource 140 executes processing operation 345 in which the communication management resource 140 implements beamforming via an alternative wireless communication protocol and corresponding wireless network with respect to the wireless network that failed to provide the corresponding communication devices continued wireless access service.

On the other hand, if the communication management resource 140 determines in processing operation 340 that no other technologies are available to provide the backup wireless coverage, the communication management resource 140 executes processing operation 350 in which the communication management resource 140 waits until the original wireless access technologies are restored for the failed wireless network to provide the communication devices access to the remote network 190 again.

Figure 4:
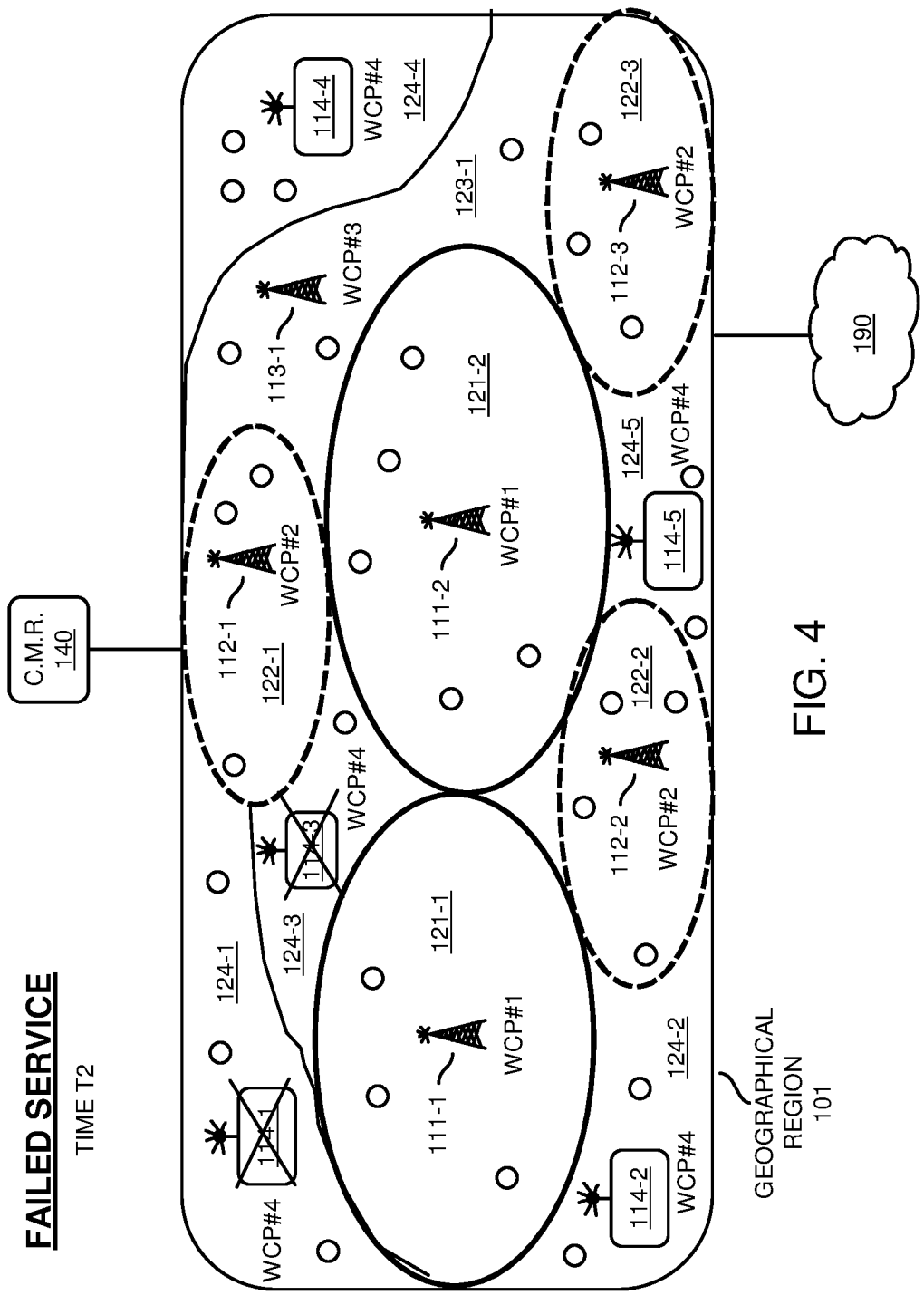
FIG. 4 is an example diagram illustrating detection of a failed wireless network according to embodiments herein.

FIG. 4 is an example diagram illustrating detection of a failed wireless network according to embodiments herein.

As previously discussed in FIG. 2, the wireless networks provide wireless access services to each of multiple communication devices between time T1 and time T2.

At or around time T2, as shown in FIG. 4, assume that the communication management resource 140 detects that the wireless access points 114-1 and 114-3 experience a respective failure. In such an instance, the communication devices disposed in the sub-geographical region 124-1 and sub geographical region 124-3 no longer have wireless access to the network 190 via network 114 and corresponding wireless access point 114-1 and wireless access point 114-2.

In yet further embodiments, the communication management resource 140 or other suitable entity can be configured to determine the region of wireless coverage supported by each of the wireless stations (wireless access points, wireless base stations, etc.) of a failing wireless network in any suitable manner.

For example, in one embodiment, the communication management resource 140 or other suitable entity partitions the geographical region 101 into multiple sub geographical regions indicating the different regions support by different wireless communication protocols. If desired, the communication management resource 140 tracks locations of communication devices in each geographical region supported by the wireless networks and adjusts operation of the backup wireless network (such as wireless network 111 in this example) to provide the expanded wireless coverage in the geographical region 101 via adjusting the operation of a non-failing wireless network 111 based on the tracked locations of the communication devices in sub-geographical regions 124-1 and 124-3.

For example, when the communication devices in the geographical regions 124-1 and 124-3 lose access via the failed wireless network 114 (as a result of the outage a time T2), they automatically switch over (such as via respective handoffs) to the wireless network 111 using the wireless communication protocol #1. The communication devices in sub-geographical regions 124-1 and 124-3 can be configured to detect when the respective wireless access points 114-1 and 114-3 experience a respective failure (outage) in which they no longer receive wireless communications from wireless access points 114-1 and 114-3. The communication devices can be configured to automatically switch over to wireless network 111 using the wireless communication protocol #1 or other wireless communication protocol #2 or wireless communication protocol #3. The communication devices can be configured to try each of the different backup wireless communication protocols to determine which of the wireless networks is going provide a backup coverage if the main wireless network fails.

As a further example, prior to the detected failure at time T2, the communication management resource 140 determines that the wireless network 111 and corresponding wireless base station 111-1 supporting wireless communication protocol #1 are going to provide backup to the sub geographical regions 124-1 and 124-3 in the event that one or more of the wireless access point 114-1 and wireless access point 114-3 happen to fail. Prior to the respective failure, the communication management resource 140 communicates notification of the backup assignment to the communication devices in sub geographical region 124-1 and sub geographical region 124-3 such that, in the event that the one or more wireless access point 114-1 and/or 114-3 fails, those devices are to switch over to monitoring use of wireless communication protocol #1 to establish discovery and connectivity with the wireless base station 111-1 as a backup wireless access service.

Thus, the wireless network 114 initially provides wireless connectivity to respective communication devices in sub-geographical region 124-1 and sub-geographical region 124-3 via a wireless communication protocol #4; the wireless network 111 initially provides wireless connectivity to respective communication devices in sub-geographical region 121-1 via a wireless communication protocol #1. During the respective detected outage, the communication devices previously in communication with the wireless network 114 discontinue communications in accordance with the wireless application protocol #4 and instead perform a respective handoff to communicate with the wireless network 111 via the wireless communication protocol #1. This can include each of the communication devices transmitting a discovery message via the wireless communication protocol #1 because the wireless communication protocol #4 no longer provides such devices wireless connectivity. After the communication management resource 140 increases the coverage provided by the wireless network 111 and corresponding wireless base station 111-1, the wireless base station 111-1 responds to any discovery request messages with a respective discovery response message notifying the communication devices in sub-geographical regions 124-1 and 124-3 of its availability to communicate via wireless communication protocol #1.

In one embodiment, assume that the communication management resource 140 detects that the wireless base station 111-1 in its current configuration is unable to provide wireless connectivity to the communication devices in the sub geographical region 124-1 and sub geographical region 124-3. In response to detecting this condition, the communication management resource 140 expands the coverage of the wireless network 111 to provide wireless coverage to the wireless communication protocol #1 via expansion of the region of wireless coverage provided by the wireless station 111-1 as further discussed in FIG. 5.

Figure 5:
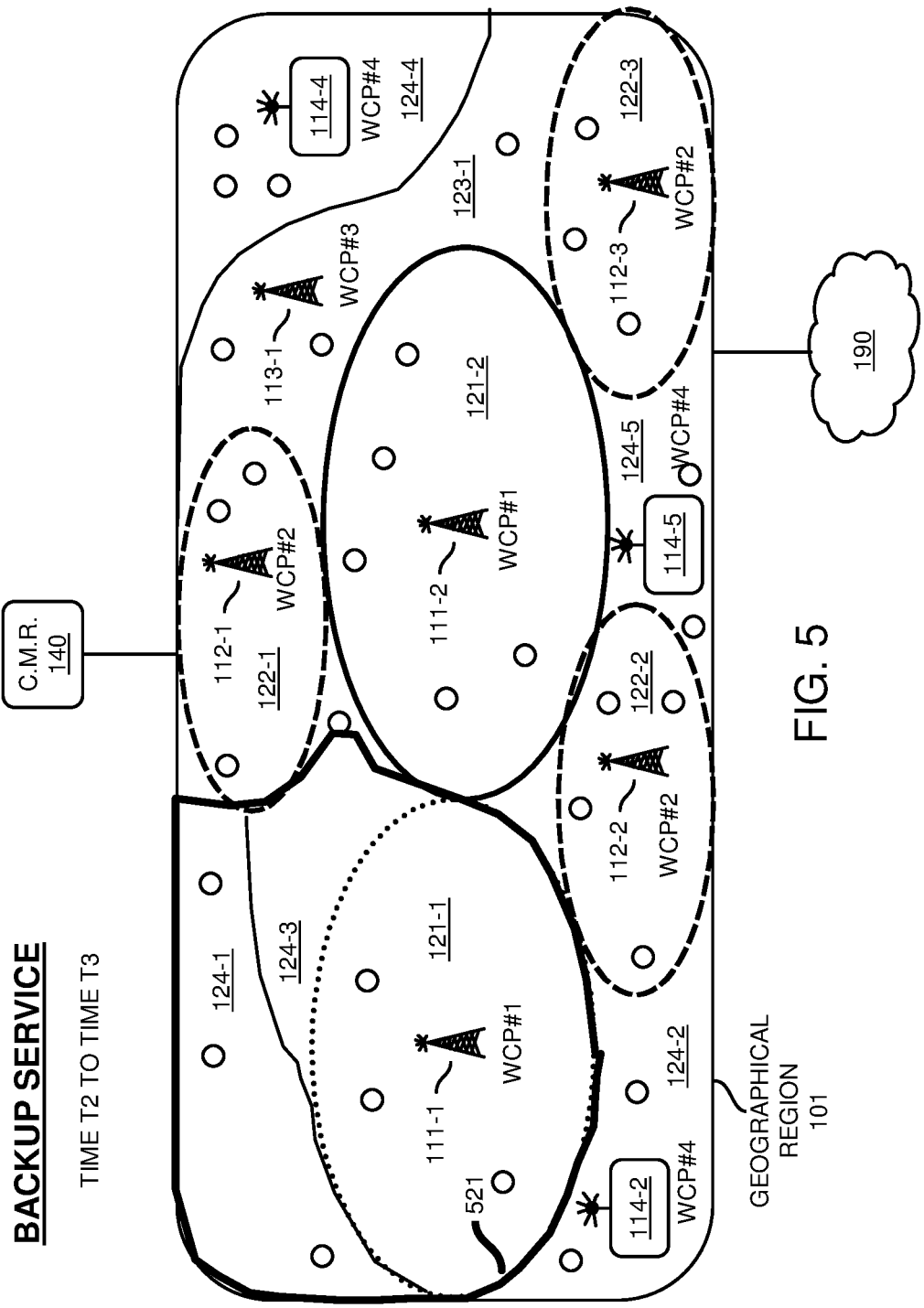
FIG. 5 is an example diagram illustrating backup wireless network services according to embodiments herein.

FIG. 5 is an example diagram illustrating backup wireless network services according to embodiments herein.

As previously discussed, the communication management resource can be configured to adjust the operation of the wireless network 111 in any suitable manner during a respective outage associated with the wireless network 114 between time T2 and time T3. For example, in one embodiment, the communication management resource can be configured to adjust beamforming and/or wireless transmit settings of wireless base station 111-1 and/or corresponding wireless network 111 to provide expanded coverage during the outage of the wireless network 114. For example, as shown, the wireless coverage 521 associated with the wireless base station 111-1 is expanded from the sub geographical region 121-1 to support the combination of sub geographical region 121-1, some geographical region 124-1 and sub geographical region 124-3.

Additionally, or alternatively, as previously discussed, the communication management resource 140 can be configured to adjust operation of the wireless network 111 via increasing wireless power transmission levels of communications transmitted by the wireless network 111 (and corresponding one or more wireless base stations) to provide wireless access to those communication devices experiencing the outage associated with wireless application protocol #4.

Thus, embodiments herein include, via the communication management resource 140, expanding an area of wireless coverage of the wireless network 111 to accommodate the inability (outage) of the wireless network 114 to provide wireless coverage to any communication devices in the geographical regions 124-1 and 124-3. As previously discussed, prior to the detected outage, the wireless network 111 and corresponding communication devices use wireless communication protocol #4 to establish wireless connectivity. During the outage between time T2 and time T3, the wireless network 111 supports backup wireless services via wireless communication protocol #1 in the expanded area of coverage 521 (such as expanded to sub-geographical regions 124-1 and sub-geographical region 124-3) previously serviced by the wireless network 114 that has now failed.

In further example embodiments, prior to the detected outage of wireless access stations 114-1 and 114-3 (such as wireless access point, wireless base station, etc.), the communication management resource 140 controls the wireless network 114 and the wireless network 111 such that only the wireless network 114 provides wireless coverage in the sub-geographical region 124-1 and 124-3. Subsequent to detecting the outage (such as failure) associated with operation of the wireless network 114 in the geographical regions 124-1 and 124-3, the communication management resource 140 adjusts operation of the wireless network 111 to provide the expanded wireless coverage 521 in the geographical region using the wireless communication protocol #1 and corresponding wireless resources.

Note that a handoff of a respective wireless communication device and corresponding wireless communication link from the failing wireless access point 114-1 to the wireless base station 111-1 providing backup wireless services can further include the corresponding communication device switching from using one or more first wireless channels supporting the wireless communication protocol #4 during the non-failure condition (T1-T2) to using one or more second wireless channels supporting the wireless communication protocol #1 during the failure (T2-T3) associated with the wireless access point 114-1 and wireless access point 114-3.

Figure 6:
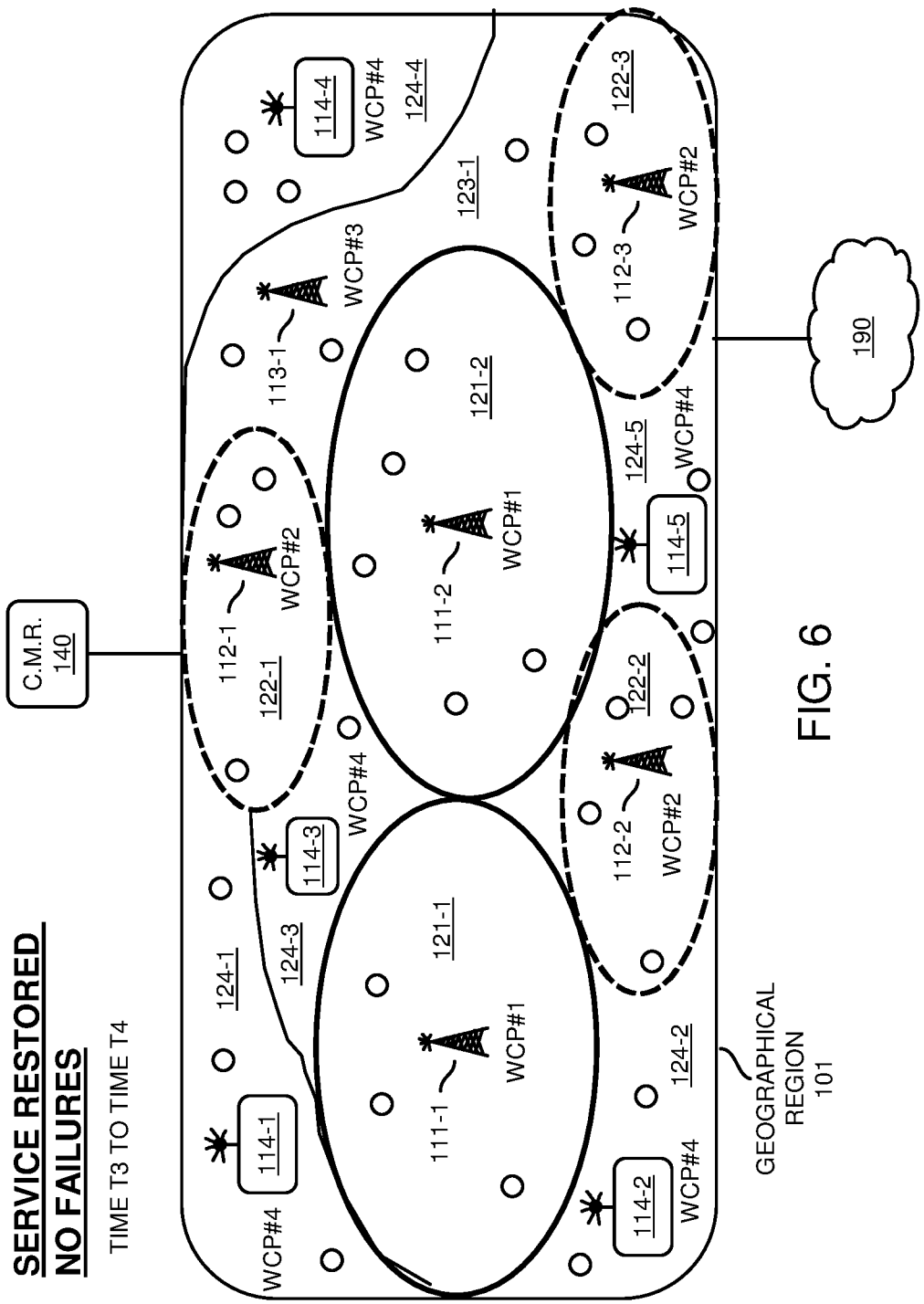
FIG. 6 is an example diagram illustrating a restored wireless network service condition in which there are no failures in a respective network environment according to embodiments herein.

FIG. 6 is an example diagram illustrating a restored wireless network service condition in which there are no failures in a respective network environment according to embodiments herein.

At or around time T3, the communication management resource detects that the wireless network 114 has been repaired and provides wireless service again. In such an instance, the expanded service associated with the wireless network 111 corresponding wireless base station 111-1 as previously discussed is terminated causing the communication devices in sub-geographical regions 124-1 and 124-3 to handoff respective wireless communication links from wireless network 111 to respective wireless access stations in wireless network 114. For example, communication devices in sub geographical region 124-1 handoff from the wireless base station 111-1 to the wireless access point 114-1 supporting wireless communication protocol #4 and corresponding supported carrier frequencies (channels). In a similar manner, communication devices in sub-geographical region 124-3 handoff from the wireless base station 111-1 to the wireless access point 114-3 supporting wireless communication protocol #4 and corresponding supported carrier frequencies (channels).

Between time T3 and time T4, the communication management resource 140 controls the wireless networks to provide original connectivity services in a similar manner as previously discussed with respect to FIG. 2 when there were no wireless network outages.

Figure 7:
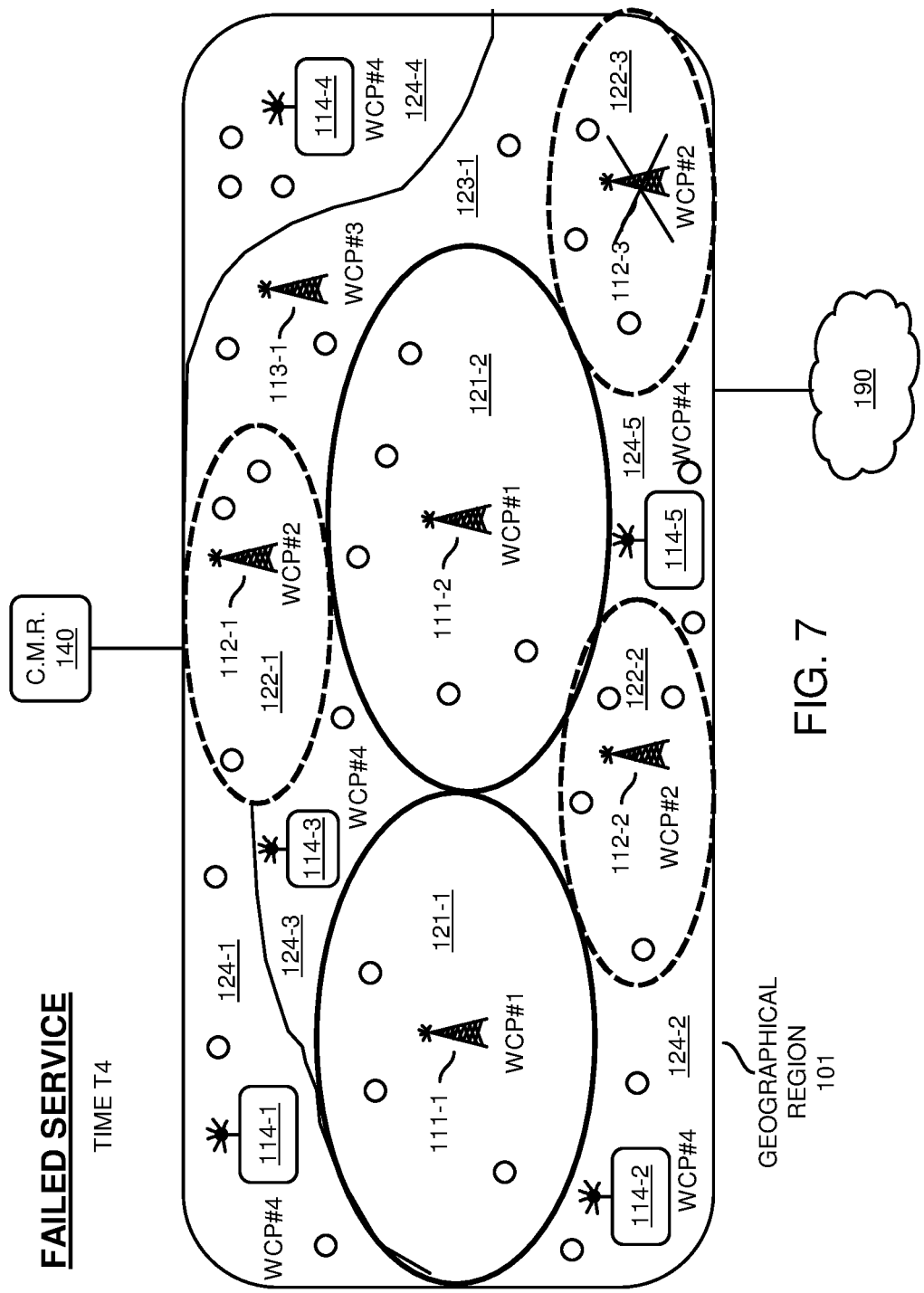
FIG. 7 is an example diagram illustrating detection of a failed wireless network according to embodiments herein.

FIG. 7 is an example diagram illustrating detection of a failed wireless network according to embodiments herein.

At or around time T4, as shown in FIG. 7, assume that the communication management resource 140 detects that the wireless base station 112-3 experiences a respective failure. In such an instance, the communication devices disposed in the sub-geographical region 122-3 no longer have wireless access to the network 190 through network 112.

Figure 8:
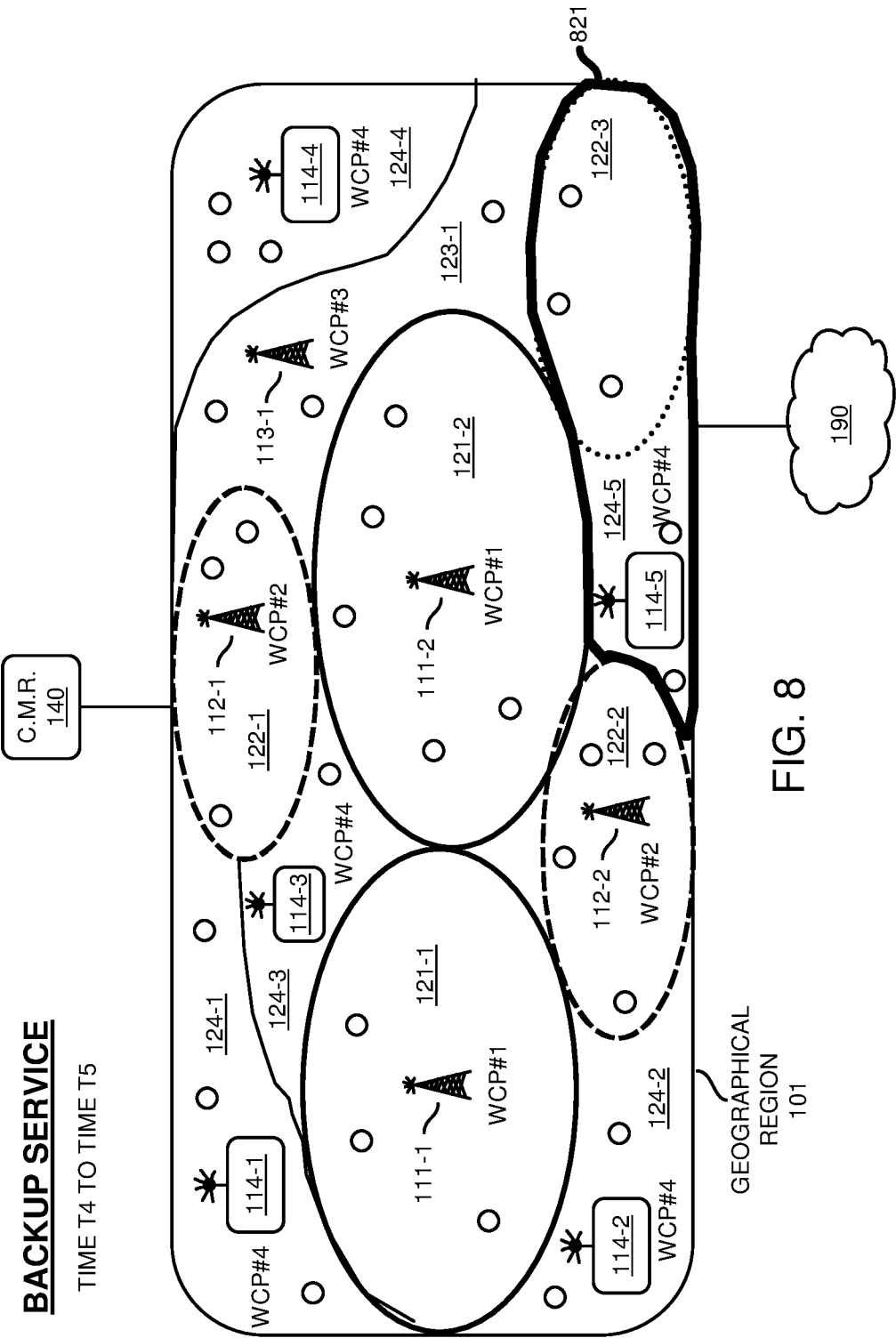
FIG. 8 is an example diagram illustrating backup wireless network services according to embodiments herein.

FIG. 8 is an example diagram illustrating backup wireless network services according to embodiments herein.

In response to the outage associated with the wireless base station 112-3, the communication management resource 140 can be configured to adjust the operation of the wireless network 114 in any suitable manner during a respective outage associated with the wireless network 112 between time T4 and time T5.

For example, in one embodiment, the communication management resource 140 adjusts beamforming and/or wireless transmit settings of wireless base station 114-5 and/or corresponding wireless network 114 to provide expanded coverage during the outage of the wireless network 112. For example, the wireless coverage associated with the wireless access point 114-5 is expanded from the sub geographical region 124-5 to support the combination (region of wireless coverage 821) of sub geographical region 124-5 and sub geographical region 122-3.

Additionally, or alternatively, as previously discussed, note again that the communication management resource 140 can be configured to adjust operation of the wireless network 114 via increasing wireless power transmission levels of communications transmitted by the wireless network 114 (and corresponding one or more wireless base stations) to provide wireless access to those communication devices experiencing the outage associated with wireless communication protocol #2 previously supported by the wireless base station 112-3.

Thus, embodiments herein include, via the communication management resource 140, expanding an area of wireless coverage of the wireless network 114 to accommodate the inability (outage) of the wireless network 112 and corresponding wireless base station 112-3 to provide wireless coverage to any communication devices in the geographical region 122-3. As previously discussed, prior to the detected outage, the wireless network 112 and corresponding communication devices use wireless communication protocol #2 to establish wireless connectivity. Conversely, during the outage between time T4 and time T5, the wireless network 114 supports backup wireless services via wireless communication protocol #4 in the expanded area of coverage 821 (such as expanded to sub-geographical regions 122-3) previously serviced by the wireless network 112 that has now failed.

In further example embodiments, prior to the detected outage of wireless base station 112-3 (such as wireless access point, wireless base station, etc.), the communication management resource 140 controls the wireless network 112 and the wireless network 114 such that only the wireless network 112 provides wireless coverage in the sub-geographical region 122-3. Subsequent to detecting the outage (such as failure) associated with operation of the wireless network 112 and corresponding wireless base station 112-3 in the geographical region 122-3, the communication management resource 140 adjusts operation of the wireless network 114 to provide the expanded wireless coverage 821 in the geographical region using the wireless communication protocol #4 and corresponding wireless resources.

Note the handoff of a respective wireless communication device and corresponding wireless communication link from the failing wireless base station 112-3 to the wireless access point 114-5 providing backup wireless services can further include the corresponding communication device switching from using one or more first wireless channels supporting the wireless communication protocol #2 during the non-failure condition to using one or more second wireless channels supporting the wireless communication protocol #4 during the failure associated with the wireless base station 112-3.

Figure 9:
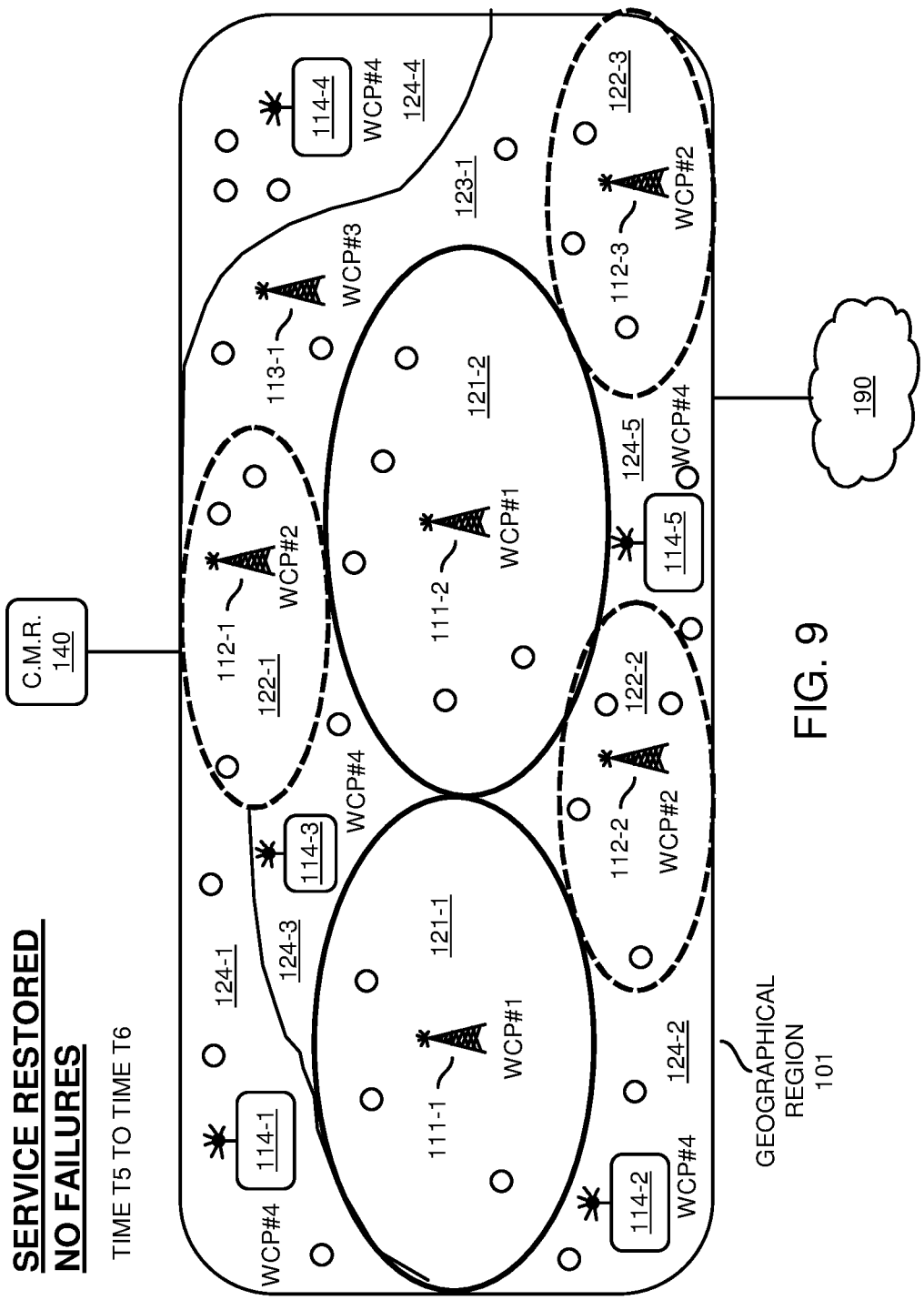
FIG. 9 is an example diagram illustrating a restored wireless network service condition in which there are no failures in a respective network environment according to embodiments herein.

FIG. 9 is an example diagram illustrating a restored wireless network service condition in which there are no failures in a respective network environment according to embodiments herein.

At or around time T5, the communication management resource 140 detects that the wireless network 112 has been repaired and provides wireless service again. In such an instance, the expanded service associated with the wireless network 114 and corresponding wireless access point 114-5 as previously discussed is terminated causing the communication devices in sub-geographical regions 122-3 to handoff respective wireless communication links from wireless network 114 to respective wireless base station 112-3 in wireless network 112. For example, communication devices in sub geographical region 122-3 handoff from the wireless access point 114-5 to the wireless base station 112-3 supporting wireless communication protocol #2 and corresponding supported carrier frequencies (channels).

Between time T5 and time T6, the communication management resource 140 controls the wireless networks to provide original connectivity services in a similar manner as previously discussed with respect to FIG. 2 when there were no wireless network outages.

Figure 10:
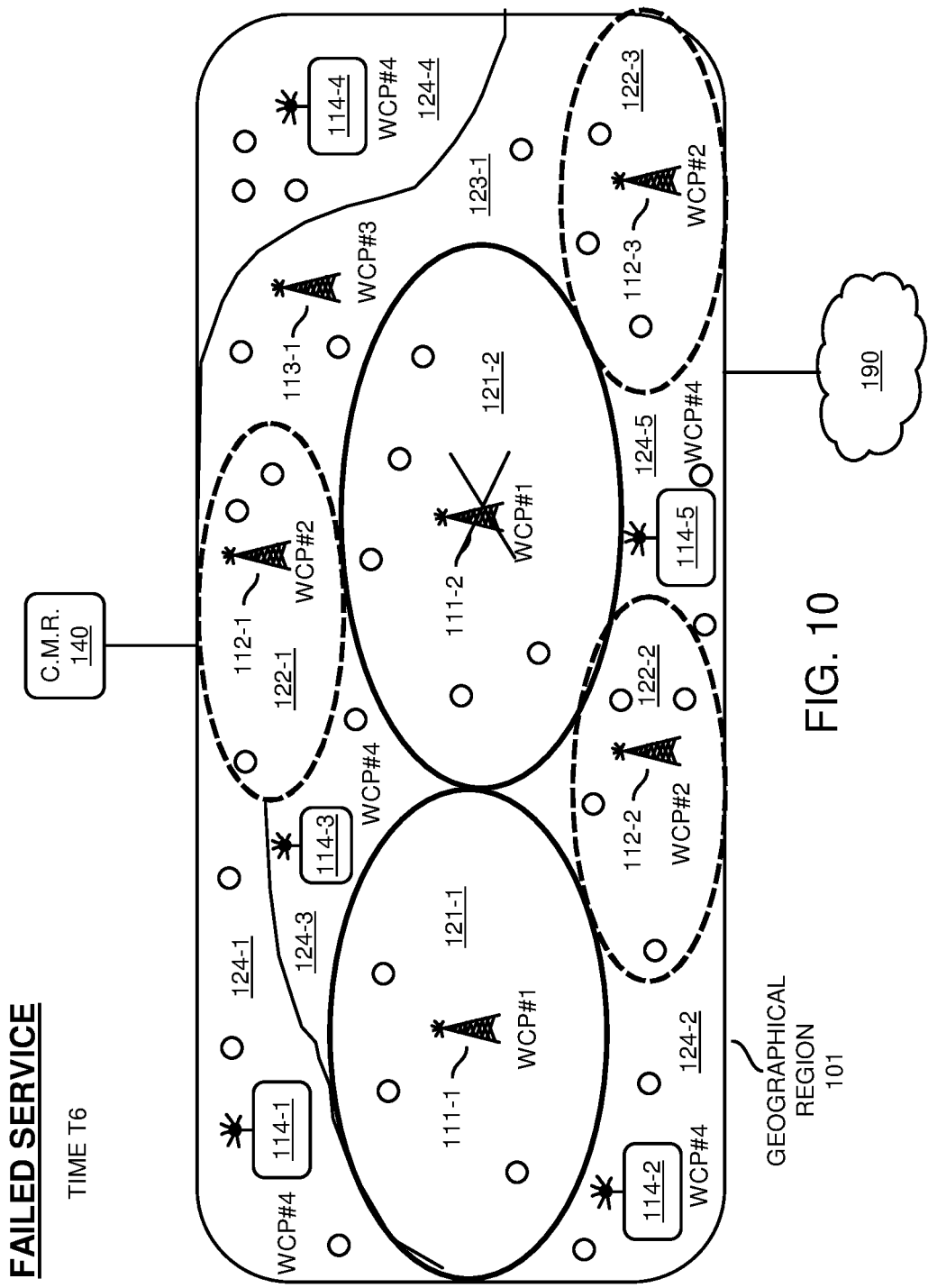
FIG. 10 is an example diagram illustrating detection of a failed wireless network according to embodiments herein.

FIG. 10 is an example diagram illustrating detection of a failed wireless network according to embodiments herein.

At or around time T6, as shown in FIG. 10, assume that the communication management resource 140 detects that the wireless base station 111-2 experiences a respective failure. In such an instance, the communication devices disposed in the sub-geographical region 121-2 no longer have wireless access to the network 190 through network 111.

Figure 11:
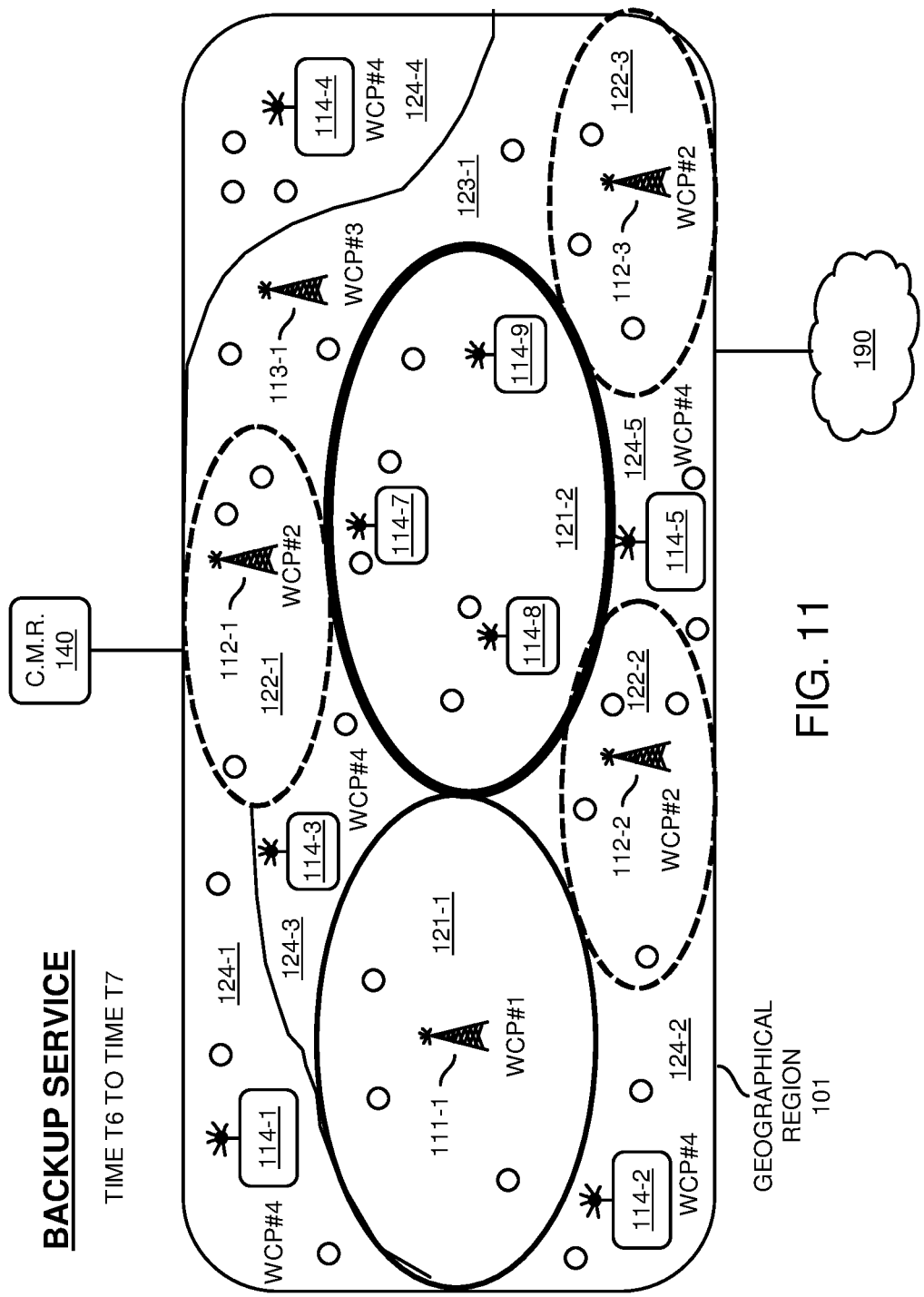
FIG. 11 is an example diagram illustrating backup wireless network services according to embodiments herein.

FIG. 11 is an example diagram illustrating backup wireless network services according to embodiments herein.

In response to the outage associated with the wireless base station 111-2, the communication management resource 140 can be configured to adjust the operation of the wireless network 114 in any suitable manner during a respective outage associated with the wireless network 111 between time T6 and time T7.

For example, in one embodiment, the communication management resource 140 adjusts operation of the wireless network 114. For example, the communication management resource 140: i) detects presence of one or more wireless access points 114-7, 114-8, and 114-9 in the wireless network 114. The wireless access points support backup wireless connectivity in the geographical region 121-2. Prior to time T6, the wireless access points 114-7, 114-8, and 114-9 are set to a standby mode in which the wireless access points do not support or provide any wireless connectivity with any of the communication devices in the network environment. In response to detecting the outage associated with wireless network 111 and corresponding wireless base station 111-2, the communication management resource 140 switches operation of the wireless access points 114-7, 114-8, 114-9 from the standby mode to an active mode in response to detecting the inability of the wireless network 111 to provide wireless coverage to respective communication devices in the geographical region 121-2. The active mode of the wireless access points provides the backup wireless connectivity to the communication devices in the geographical region 121-2 via wireless communication protocol #4 and corresponding wireless channels.

Note that the handoff of a respective wireless communication device and corresponding wireless communication link from the failing wireless base station 111-2 to a respective one of the wireless access points 114-7, 114-8, or 114-9 providing backup wireless services can further include the corresponding communication devices switching from using one or more first wireless channels supporting the wireless communication protocol #3 during the non-failure condition to using one or more second wireless channels supporting the wireless communication protocol #4 during the failure associated with the wireless base station 111-2.

In a similar manner as previously discussed, during the respective detected outage associated with wireless base station 111-2, the communication devices initially in communication with the wireless network 111 discontinue communications in accordance with the wireless application protocol #1 and instead perform a respective handoff to communicate with the wireless network 114 via the wireless communication protocol #4. This can include each of the communication devices transmitting a discovery message via the wireless communication protocol #4 because the wireless communication protocol #1 no longer provides such devices wireless connectivity. After the communication management resource 140 increases the coverage provided by the wireless network 114 via activation of wireless access points 114-7, 114-8, and 114-9, the wireless access points respond to any discovery request messages with a respective discovery response message notifying the communication devices in sub-geographical region 111-2, or portion thereof, of their availability to communicate via wireless communication protocol #4.

Figure 12:
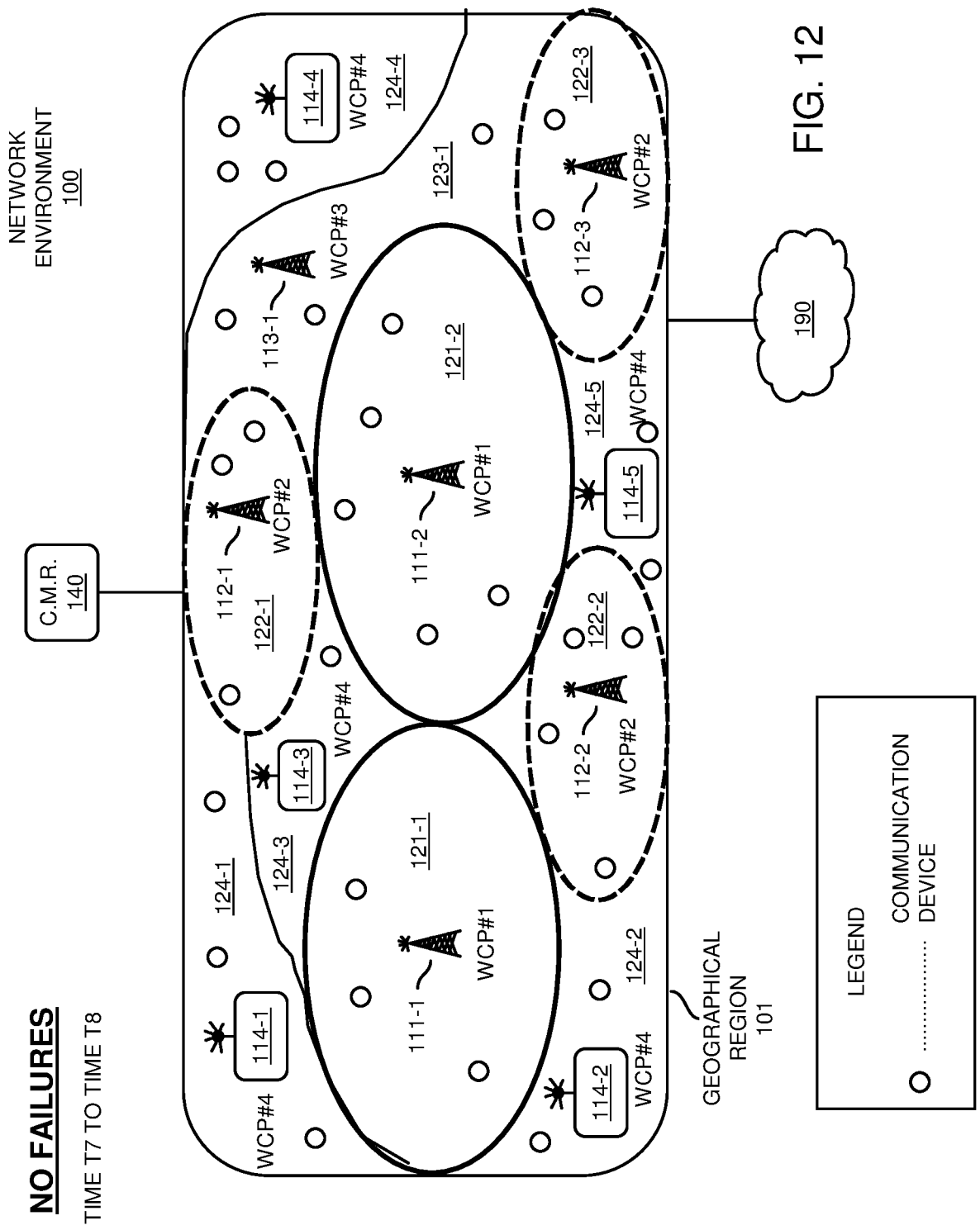
FIG. 12 is an example diagram illustrating a restored wireless network service condition in which there are no failures in a respective network environment according to embodiments herein.

FIG. 12 is an example diagram illustrating a restored wireless network service condition in which there are no failures in a respective network environment according to embodiments herein.

At or around time T7, the communication management resource 140 detects that the wireless network 111 has been repaired and provides wireless service again. In such an instance, the expanded service associated with the wireless network 114 and corresponding wireless access points as previously discussed is terminated causing the communication devices in sub-geographical region 121-2 to handoff respective wireless communication links from wireless network 114 to respective wireless access point 111-2 in wireless network 111.

Between time T7 and time T8, the communication management resource 140 controls the wireless networks to provide original connectivity services in a similar manner as previously discussed with respect to FIG. 2 when there were no wireless network outages.

Figure 13:
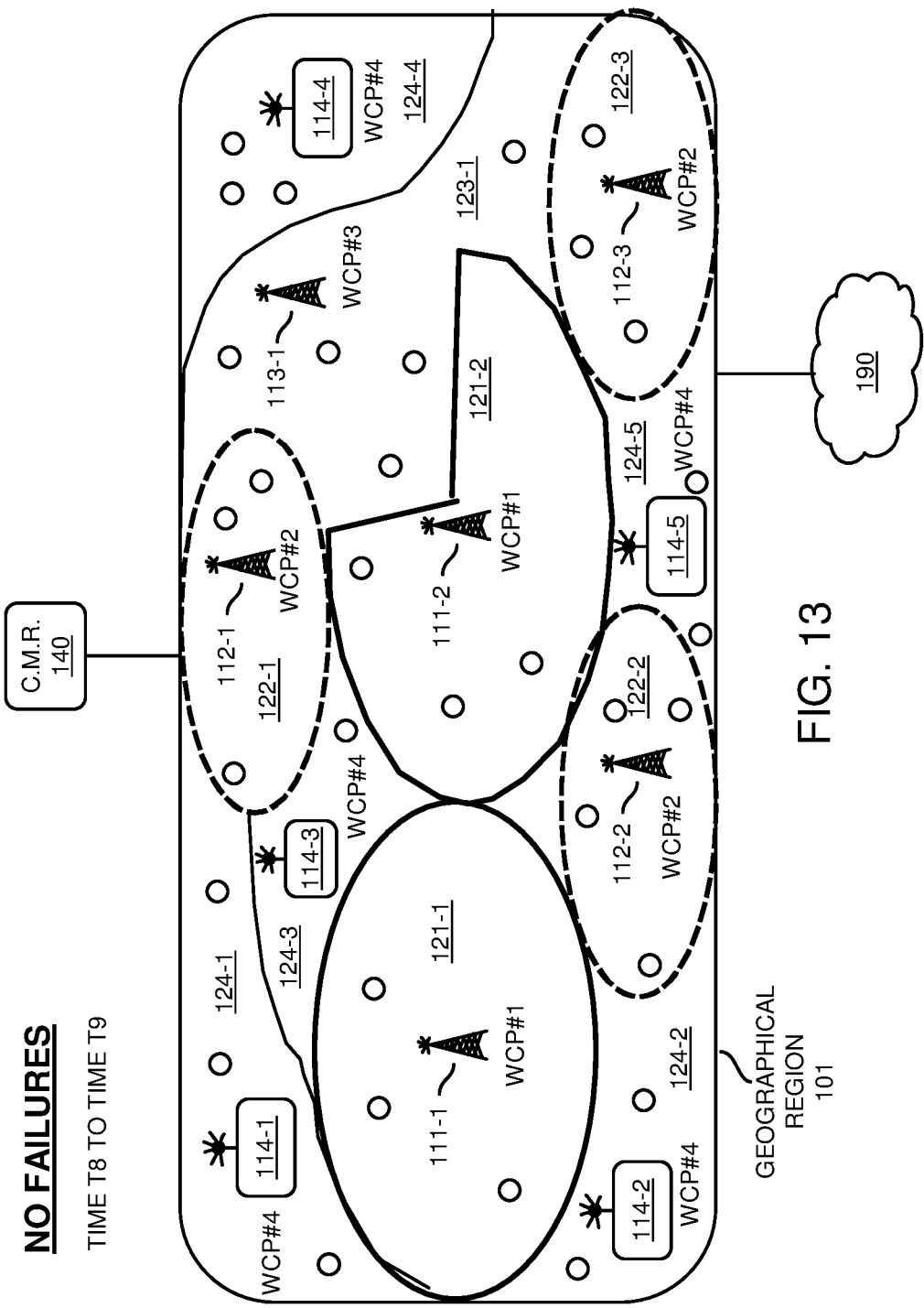
FIG. 13 is an example diagram illustrating adjustment of wireless coverage regions according to embodiments herein.

FIG. 13 is an example diagram illustrating adjustment of wireless coverage regions according to embodiments herein.

Note that the respective wireless coverage provided by each of the different wireless communication protocols can change over as shown in FIG. 13 between time T8 and time T9. Assume that the communication management resource 140 adjusts the wireless services provided to communication devices in sub-geographical region 121-2 in a manner as shown in FIG. 2. For example, wireless base station 113-1 provides expanded wireless coverage to communication devices as indicated by expanded sub-geographical region 123-1 via wireless communication protocol #3.

Figure 14:
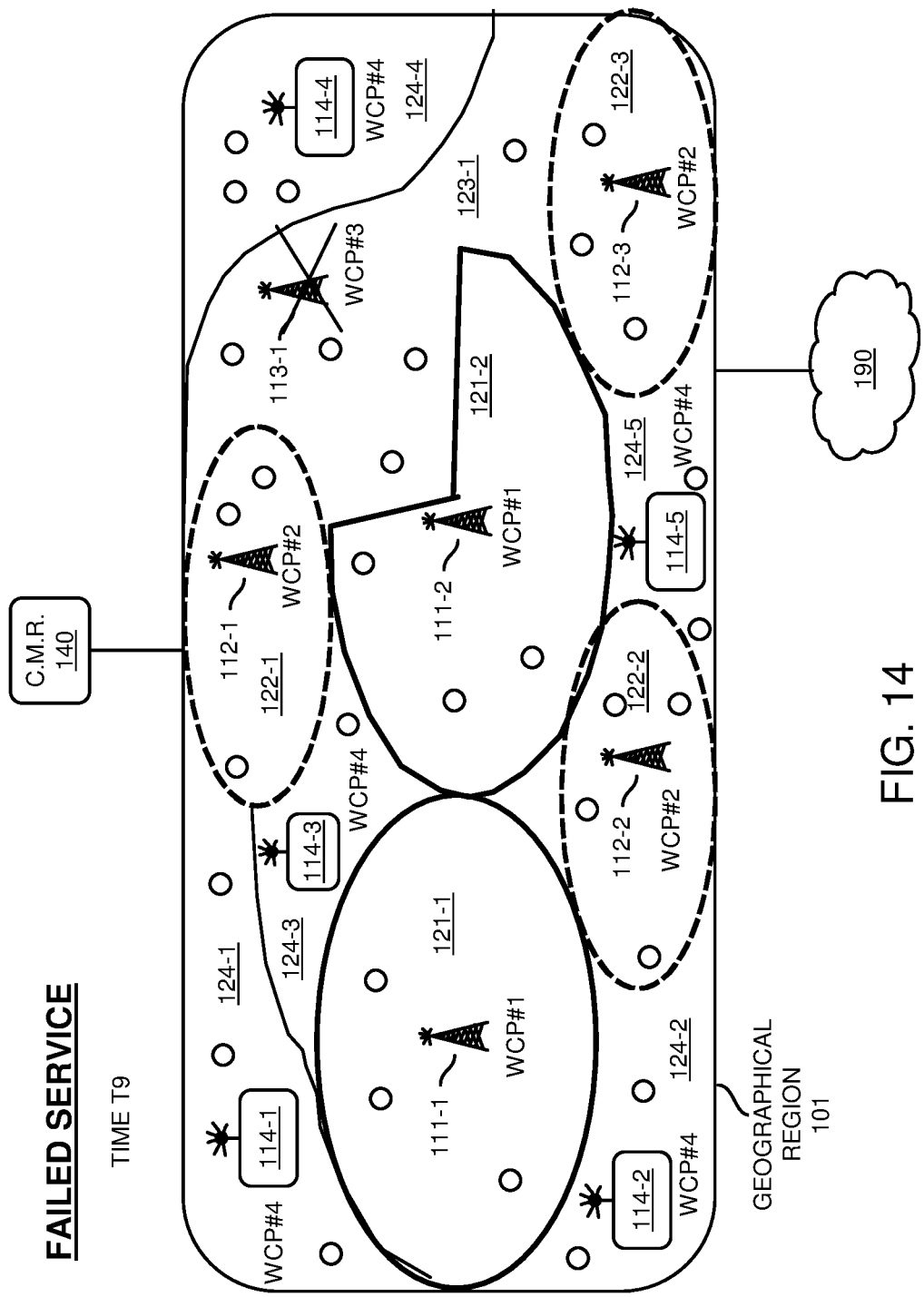
FIG. 14 is an example diagram illustrating detection of a failed wireless network according to embodiments herein.

FIG. 14 is an example diagram illustrating detection of a failed wireless network according to embodiments herein.

At or around time T9, as shown in FIG. 14, assume that the communication management resource 140 detects that the wireless base station 113-1 in wireless network 113 experiences a respective failure. In such an instance, the communication devices disposed in the sub-geographical region 123-1 no longer have wireless access to the network 190 through network 113.

Figure 15:
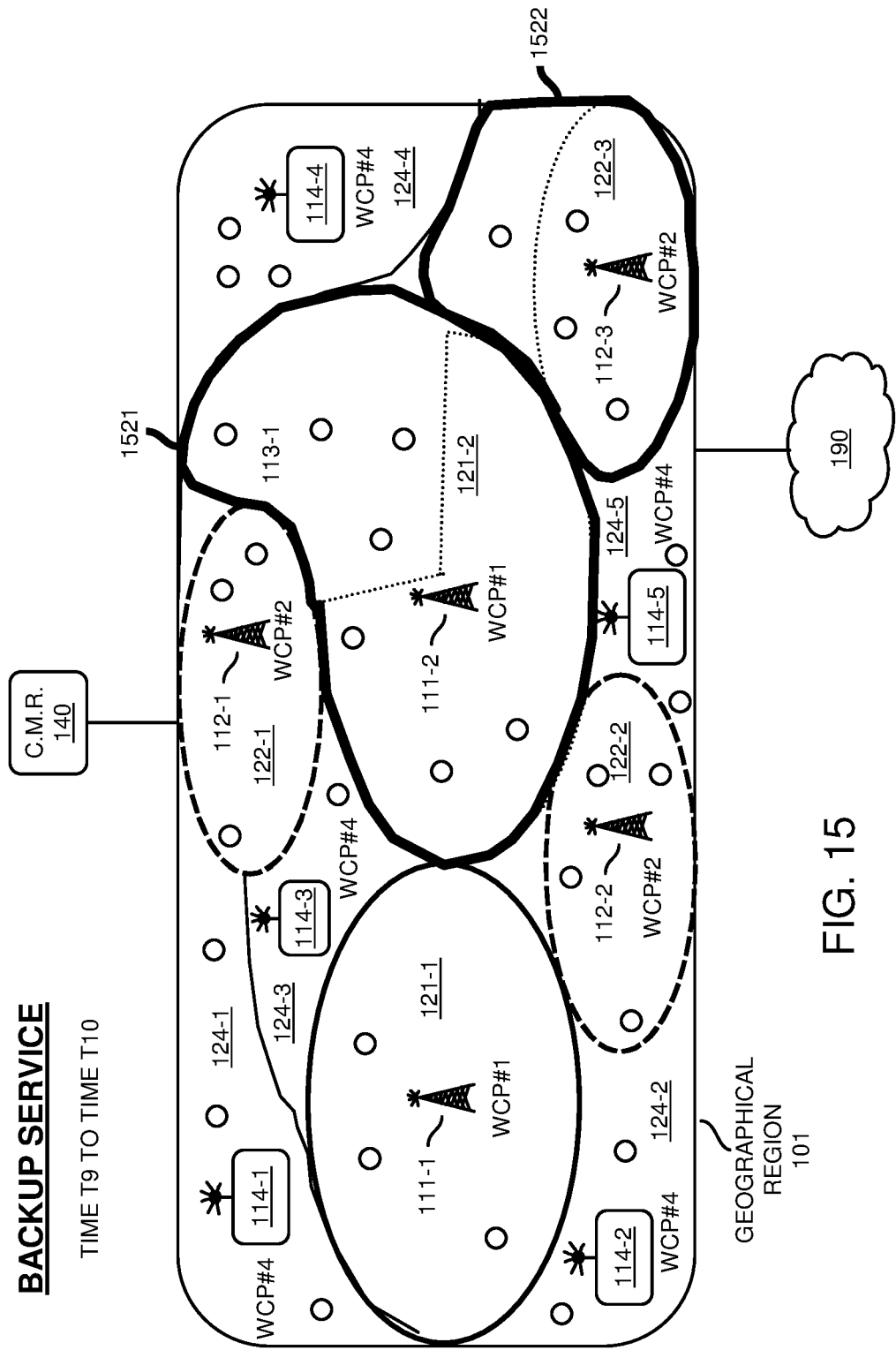
FIG. 15 is an example diagram illustrating implementation of backup wireless network services according to embodiments herein.

FIG. 15 is an example diagram illustrating backup wireless network services according to embodiments herein.

In response to the access outage associated with the wireless base station 113-1 and corresponding wireless communication protocol #3, the communication management resource 140 adjusts multiple different region of wireless coverage and corresponding wireless communication protocols to provide connectivity to communication devices that no longer can use wireless base station 113-1 to access the remote network 190.

Specifically, in response to detecting the outage associated with wireless base station 113-1, the communication management resource 140 expands the region of wireless coverage 1421 provided by the wireless base station 111-2 to accommodate a first portion of those communication devices losing access via alternative use of wireless communication protocol #3 associated with wireless base station 113-1. In this example embodiment, those communication devices that previously connected to wireless base station 113-1 via wireless communication protocol #3 now connect to wireless base station 111-2 using wireless communication protocol #1.

Additionally, in response to detecting the outage associated with wireless base station 113-1, the communication management resource 140 expands the region of wireless coverage 1422 provided by the wireless base station 112-3 to accommodate a second portion of those communication devices losing access via alternative use of wireless communication protocol #3 associated with wireless base station 113-1. In this example embodiment, those communication devices that previously connected to wireless base station 113-1 via wireless communication protocol #3 now connect to wireless base station 112-3 using wireless communication protocol #2.

Note that the communication management resource 140 can be configured to determine appropriate split between wireless base station 111-2 and wireless base station 112-3 based upon knowing the locations of the communication devices losing wireless connectivity as a result of the outage associated with the wireless base station 113-1.

More specifically, the communication management resource 140 determines that the wireless base station 111-2 can support 10 extra communication devices based on available bandwidth associated with use of wireless communication protocol #1 and corresponding wireless channels. The communication management resource 140 also determines that the wireless base station 112-3 can support 15 extra communication devices based on available bandwidth associated with use of wireless communication protocol #2 and corresponding wireless channels. In such an instance, the communication management resource expands the region of wireless coverage 1521 provided by the wireless base station 111-2 to support the extra 10 communication devices as well as all communication devices in sub-geographical region 121-2 while the communication management resource 140 expands the region of wireless coverage 1522 provided by the wireless base station 112-3 to accommodate the 15 extra communication devices. As previously discussed, the expanded coverage for each wireless base station can be achieved via beamforming, adjusted wireless power transmit levels, etc.

Figure 16:
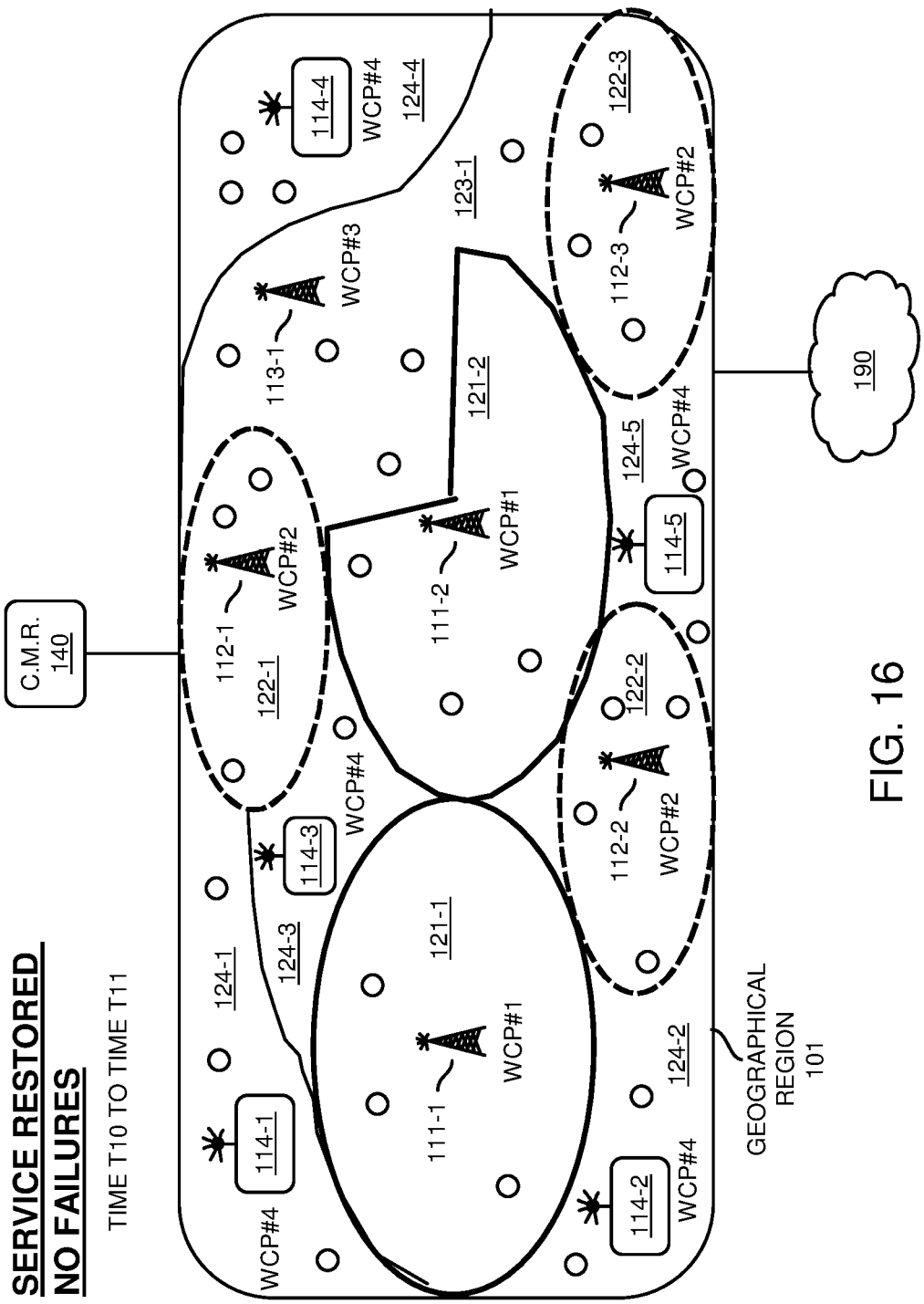
FIG. 16 is an example diagram illustrating a restored wireless network service condition in which there are no failures in a respective network environment according to embodiments herein.

FIG. 16 is an example diagram illustrating a restored wireless network service condition in which there are no failures in a respective network environment according to embodiments herein.

Between time T10 and time T11, the communication management resource 140 controls the wireless networks to provide original connectivity services in a similar manner as previously discussed with respect to FIG. 13 when there were no wireless network outages.

Figure 17:
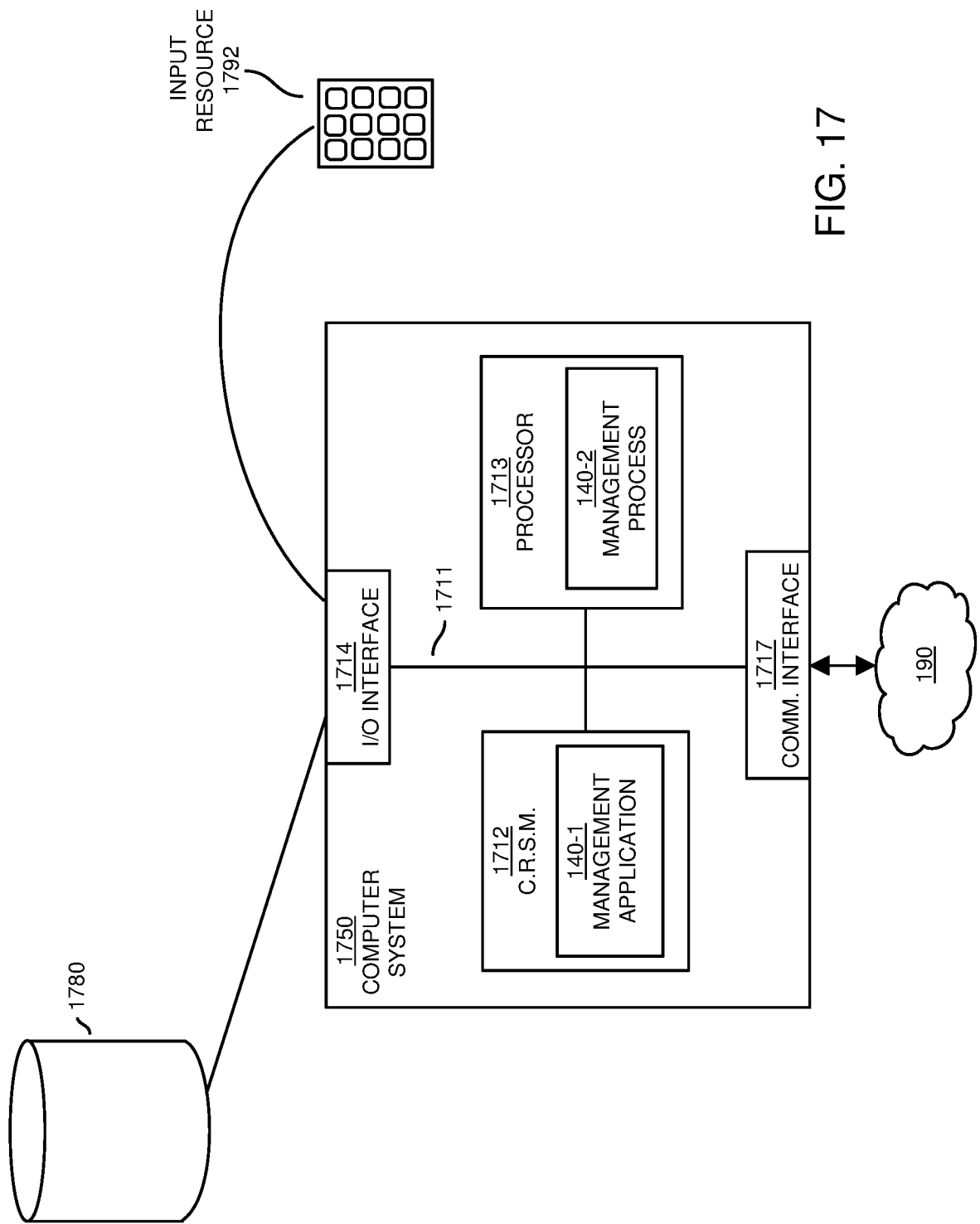
FIG. 17 is an example diagram illustrating example computer hardware and software operable to execute operations according to embodiments herein.

FIG. 17 is an example diagram illustrating example computer hardware and software operable to execute operations according to embodiments herein.

Any of the resources (such as each of one or more wireless communication devices, communication management resource 195, wireless access manager, etc.) as discussed herein can be configured to include computer processor hardware and/or corresponding executable (software) instructions to carry out the different operations as discussed herein.

As shown, computer system 1750 of the present example includes an interconnect 1711 coupling computer readable storage media 1712 such as a non-transitory type of media (which can be any suitable type of hardware storage medium in which digital information can be stored and retrieved), a processor 1713 (computer processor hardware), I/O interface 1714, and a communications interface 1717.

I/O interface(s) 1714 supports connectivity to repository 1780 and input resource 1792.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with management application 140-1 (e.g., including instructions) to carry out any of the operations as discussed herein.

During operation of one embodiment, processor 1713 accesses computer readable storage media 1712 via the use of interconnect 1711 in order to launch, run, execute, interpret or otherwise perform the instructions in in the management application 140-1 stored on computer readable storage medium 1712. Execution of the management application 140-1 produces management process 140-2 to carry out any of the operations and/or processes as discussed herein.

Those skilled in the art will understand that the computer system 1750 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1750 may reside at any location or can be included in any suitable resource in any network environment to implement functionality as discussed herein.

Functionality supported by the different resources will now be discussed via flowchart in FIG. 18. Note that the steps in the flowcharts below can be executed in any suitable order.

Figure 18:
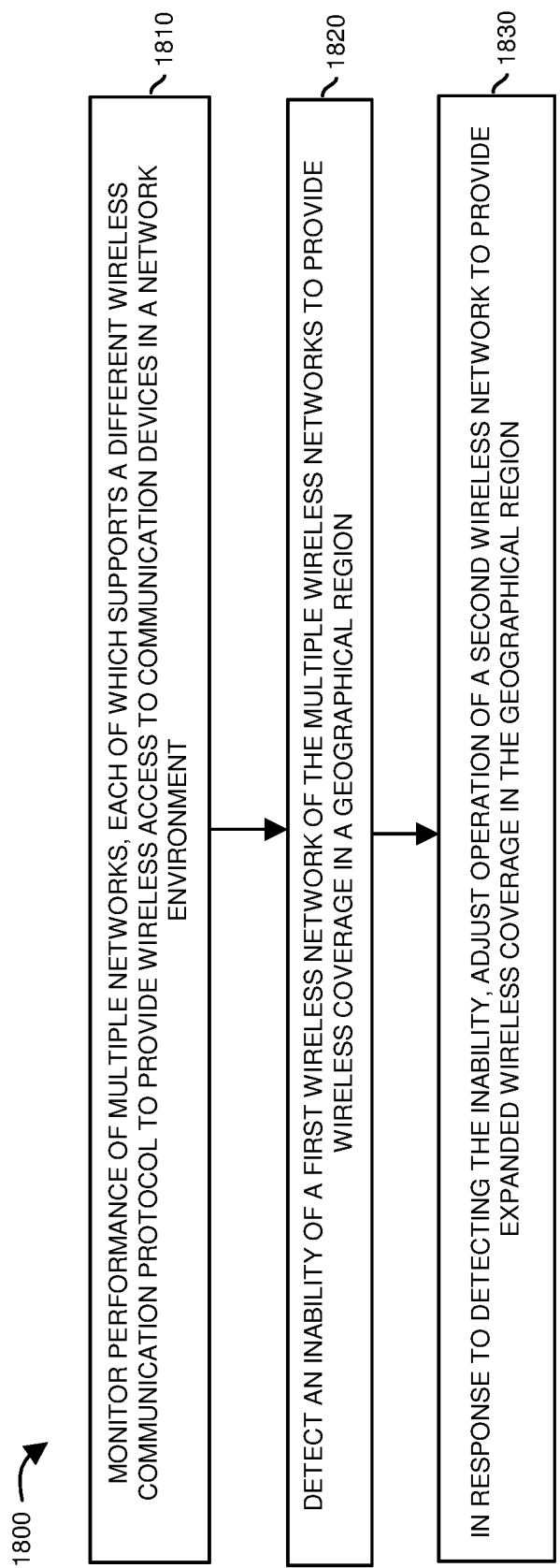
FIG. 18 is an example diagram illustrating a method according to embodiments herein.

FIG. 18 is an example diagram illustrating a method according to embodiments herein.

In processing operation 1810, the communication management resource 140 monitors performance of multiple networks, each of which supports a different wireless communication protocol to provide wireless access to communication devices in a network environment.

In processing operation 1820, the communication management resource 140 detects an inability of a first wireless network of the multiple wireless networks to provide wireless coverage in a geographical region.

In processing operation 1830, in response to detecting the inability to provide wireless coverage to respective communication devices, the communication management resource 140 adjusts operation of a second wireless network to provide expanded wireless coverage in the geographical region.

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
monitoring performance of multiple networks, each of which supports a different wireless communication protocol to provide wireless access to communication devices in a network environment;
detecting an inability of a first wireless network of the multiple wireless networks to provide wireless coverage in a geographical region via a first wireless communication protocol; and
in response to detecting the inability, adjusting operation of a second wireless network of the multiple wireless networks, the operation of the second wireless network adjusted to provide expanded wireless coverage to include the geographical region, the second wireless network implementing a second wireless communication protocol different than the first wireless protocol to provide the expanded wireless coverage.

2. The method as in claim 1, wherein the first wireless network provides first wireless connectivity to first communication devices via the first wireless communication protocol prior to the detected inability; and
wherein the second wireless network provides second wireless connectivity to second communication devices via the second wireless communication protocol.

3. The method as in claim 2, wherein each of the first communication devices and the second communication devices support wireless connectivity via the first wireless communication protocol and the second wireless communication protocol.

4. The method as in claim 1, wherein adjusting operation of the second wireless network includes adjusting beamforming settings of a wireless base station in the second wireless network to provide the expanded wireless coverage of the second wireless network to include the geographical region.

5. The method as in claim 1, wherein adjusting operation of the second wireless network includes increasing wireless power transmission levels of communications transmitted by the second wireless network into the geographical region.

6. The method as in claim 1, wherein adjusting operation of the second wireless network includes selection of an additional wireless carrier frequency for transmitting communications from the second wireless network into the geographical region.

7. The method as in claim 1, wherein adjusting operation of the second wireless network includes:
i) detecting presence of a wireless access point in the second wireless network, the wireless access point operative to support backup wireless connectivity in the geographical region, the wireless access point set to a standby mode in which the wireless access point does not support backup wireless connectivity with any of the communication devices in the network environment via the first wireless communication protocol prior to detecting the inability of the first wireless network; and
ii) switching operation of the wireless access point from the standby mode to an active mode in response to detecting the inability of the first wireless network to provide wireless coverage in the geographical region, the active mode of the wireless access point providing the backup wireless connectivity and the expanded wireless coverage to the communication devices, the communication devices being in the geographical region.

8. The method as in claim 1, wherein adjusting operation of the second wireless network includes expanding an area of wireless coverage of the second wireless network to accommodate the inability of the first wireless network to provide wireless coverage in the geographical region.

9. The method as in claim 1 further comprising:
tracking locations of first mobile communication devices in the geographical region supported by the first wireless network prior to the detected inability; and
wherein adjusting operation of the second wireless network to provide the expanded wireless coverage in the geographical region in response to the detected inability includes adjusting the operation of the second wireless network based on the tracked locations of the first mobile communication devices.

10. The method as in claim 1, wherein the first wireless network is operative to provide first communication devices in the geographical region access to a remote network through the first wireless network via the first wireless communication protocol prior to the detected inability.

11. The method as in claim 10, wherein the inability of the first wireless network to provide the wireless coverage in the geographical region includes discontinued operation of the first wireless network and corresponding use of the first wireless communication protocol to provide the first communication devices in the geographical region access to the remote network.

12. The method as in claim 11, wherein the adjusted operation of the second wireless network includes the second wireless network providing the first communication devices in the geographical region access to the remote network through the second wireless network using the second wireless communication protocol.

13. The method as in claim 1, wherein monitoring the performance of the multiple networks includes: via communication management hardware monitoring the first wireless network supporting the first wireless communication protocol and the second wireless network supporting the second wireless communication protocol, receiving performance feedback indicating the inability of the first wireless network of the multiple wireless networks to provide the wireless coverage in the geographical region.

14. The method as in claim 1 further comprising:
detecting the inability via failure of receiving a heartbeat message from the first wireless network.

15. The method as in claim 1, wherein the second wireless network is configured to provide a first region of wireless coverage using the second wireless communication protocol prior to detecting the inability of the first wireless network to provide wireless coverage in the geographical region; and
wherein adjusting the operation of the second wireless network includes increasing a size of the first region of wireless coverage to a second region of wireless coverage provided by the second wireless network, the second region of wireless coverage including the geographical region.

16. The method as in claim 1 further comprising:
subsequent to the detected inability, in response to detecting an ability of the first wireless network to provide wireless services to communication devices in the geographical region, initiate handoffs of the communication devices from the second wireless network to the first wireless network.

17. The method as in claim 1, wherein the second wireless network is operative to provide notification of availability of the second wireless network and corresponding wireless services to a set of communication devices present in the geographical region subsequent to detecting the inability of the first wireless network to provide the wireless coverage in the geographical region.

18. The method as in claim 1, wherein the first wireless network provides the wireless coverage in the geographical region via a first wireless channel prior to the detected inability; and
wherein the second wireless network provides the expanded wireless coverage into the geographical region via a second wireless channel, the second wireless channel different than the first wireless channel.

19. The method as in claim 1, wherein the first wireless network provides the wireless coverage in the geographical region via a first wireless carrier frequency prior to the detected inability; and
wherein the second wireless network provides the expanded wireless coverage into the geographical region via a second wireless carrier frequency, the second wireless carrier frequency different than the first wireless carrier frequency.

20. A system comprising:
communication management hardware operative to:
monitor performance of multiple networks, each of which supports a different wireless communication protocol to provide wireless access to communication devices in a network environment;
detect an inability of a first wireless network of the multiple wireless networks to provide wireless coverage in a geographical region via a first wireless communication protocol; and
in response to detecting the inability, adjust operation of a second wireless network of the multiple wireless networks, the operation of the second wireless network adjusted to provide expanded wireless coverage to include the geographical region, the second wireless network implementing a second wireless communication protocol different than the first wireless communication protocol to provide the expanded wireless coverage.

21. The system as in claim 20, wherein the first wireless network provides first wireless connectivity to first communication devices via the first wireless communication protocol; and
wherein the second wireless network provides second wireless connectivity to second communication devices via the second wireless communication protocol.

22. The system as in claim 21, wherein each of the first communication devices and the second communication devices support wireless connectivity via the first wireless communication protocol and the second wireless communication protocol.

23. The system as in claim 20, wherein the communication management hardware is further operative to:
adjust beamforming settings of a wireless base station in the second wireless network to provide the expanded wireless coverage.

24. The system as in claim 20, wherein the communication management hardware is further operative to:
increase wireless power transmission levels of communications transmitted by the second wireless network to provide the expanded wireless coverage into the geographical region.

25. The system as in claim 20, wherein the communication management hardware is further operative to:
change a wireless carrier frequency of transmitting communications from the second wireless network to provide the expanded wireless coverage into the geographical region.

26. The system as in claim 20, wherein the communication management hardware is further operative to:
i) detect presence of a wireless access point in the second wireless network, the wireless access point operative to support backup wireless connectivity, the wireless access point set to a standby mode in which the wireless access point does not support backup wireless connectivity with any of the communication devices in the network environment prior to detecting the inability of the first wireless network; and
ii) switch operation of the wireless access point from the standby mode to an active mode in response to detecting the inability of the first wireless network to provide wireless coverage, the active mode of the wireless access point providing the backup wireless connectivity and the expanded wireless coverage to at least a portion of the communication devices region.

27. The system as in claim 20, wherein the communication management hardware is further operative to:
provide the expanded wireless coverage of the second wireless network into the geographical region to accommodate the inability of the first wireless network to provide wireless coverage in the geographical region.

28. The system as in claim 20, wherein the communication management hardware is further operative to:
track locations of first mobile communication devices in the geographical region supported by the first wireless network prior to the detected inability; and
adjust operation of the second wireless network to provide the expanded wireless coverage in the geographical region, the adjusted operation based on the tracked locations of the first mobile communication devices.

29. Computer-readable storage hardware having instructions stored thereon, the instructions, when carried out by computer processor hardware associated with customer premises equipment in a wireless network, cause the computer processor hardware to:
monitor performance of multiple networks, each of which supports a different wireless communication protocol to provide wireless access to communication devices in a network environment;
detect an inability of a first wireless network of the multiple wireless networks to provide wireless coverage in a geographical region via a first wireless communication protocol; and
in response to detecting the inability, adjust operation of a second wireless network of the multiple wireless networks, the operation of the second wireless network adjusted to provide expanded wireless coverage to include the geographical region, the second wireless network implementing a second wireless communication protocol different than the first wireless communication protocol to provide the expanded wireless coverage.

* * * * *